United States Patent
D'Orazio et al.

(10) Patent No.: US 11,718,137 B2
(45) Date of Patent: Aug. 8, 2023

(54) SHOCK ASSEMBLY WITH AUTOMATICALLY ADJUSTABLE RIDE HEIGHT

(71) Applicant: Fox Factory, Inc., Duluth, GA (US)

(72) Inventors: Nick D'Orazio, Santa Cruz, CA (US); Michael R. Labbe, Scotts Valley, CA (US); Rick Strickland, Dacula, GA (US); Connor Randall, Salida, CO (US)

(73) Assignee: Fox Factory, Inc., Duluth, GA (US)

( * ) Notice: Subject to any disclaimer, the term of this patent is extended or adjusted under 35 U.S.C. 154(b) by 54 days.

(21) Appl. No.: 17/185,766

(22) Filed: Feb. 25, 2021

(65) Prior Publication Data
US 2021/0268857 A1 Sep. 2, 2021

Related U.S. Application Data

(60) Provisional application No. 63/110,204, filed on Nov. 5, 2020, provisional application No. 62/982,629, filed on Feb. 27, 2020.

(51) Int. Cl.
| | |
|---|---|
| *B60G 15/06* | (2006.01) |
| *F16F 9/32* | (2006.01) |
| *F16F 9/512* | (2006.01) |

(52) U.S. Cl.
CPC .......... *B60G 15/062* (2013.01); *F16F 9/3264* (2013.01); *F16F 9/5126* (2013.01); *B60G 2202/312* (2013.01); *B60G 2500/114* (2013.01)

(58) Field of Classification Search
CPC ............ B60G 2500/114; B60G 15/062; B62K 2025/044; B62K 2025/045; F16F 9/56
See application file for complete search history.

(56) References Cited

U.S. PATENT DOCUMENTS

| | | | |
|---|---|---|---|
| 3,986,118 A | 10/1976 | Madigan | |
| 5,952,823 A | 9/1999 | Sprecher et al. | |
| 7,374,028 B2 | 5/2008 | Fox | |
| 8,480,064 B2 * | 7/2013 | Talavasek | F16F 9/56 280/283 |
| 8,627,932 B2 | 1/2014 | Marking | |

(Continued)

FOREIGN PATENT DOCUMENTS

| | | | | |
|---|---|---|---|---|
| EP | 2902222 A1 * | 8/2015 | ......... | B60G 17/0164 |
| WO | WO-2022074578 A1 * | 4/2022 | | |

OTHER PUBLICATIONS

Extended European Search Report for EP Application 21160101.8, dated Aug. 5, 2021, 7 pages.

*Primary Examiner* — Paul N Dickson
*Assistant Examiner* — Maxwell L Meshaka

(57) ABSTRACT

A shock assembly with automatically adjustable ride height is disclosed. The assembly includes a main chamber including a fluid therein. A pump tube within the main chamber, the pump tube having a fluid flow path internal thereto, the pump tube disposed axially along a center of the main chamber. A damping piston coupled to a shaft, the damping piston and a portion of the shaft disposed axially about the pump tube, the damping piston disposed in the main chamber to divide the main chamber into a compression side fluid chamber and a rebound side fluid chamber. An automatic ride height adjustment assembly including a tube-in-shaft pump assembly and a spring preload piston assembly.

17 Claims, 23 Drawing Sheets

(56) References Cited

U.S. PATENT DOCUMENTS

| | | | |
|---|---|---|---|
| 8,857,580 B2 | 10/2014 | Marking | |
| 9,033,122 B2 | 5/2015 | Ericksen et al. | |
| 9,114,846 B1* | 8/2015 | Ishikawa | F16F 9/56 |
| 9,120,362 B2 | 9/2015 | Marking | |
| 9,239,090 B2 | 1/2016 | Marking et al. | |
| 9,353,818 B2 | 5/2016 | Marking | |
| 10,933,710 B2 | 3/2021 | Tong | |
| 2006/0289258 A1* | 12/2006 | Fox | F16F 9/512 |
| | | | 188/316 |
| 2011/0024957 A1* | 2/2011 | Nagai | F16F 9/56 |
| | | | 267/34 |
| 2011/0227301 A1* | 9/2011 | Nagai | B60G 17/04 |
| | | | 280/6.157 |
| 2011/0298168 A1* | 12/2011 | Groebner | F16F 1/121 |
| | | | 267/217 |
| 2012/0007327 A1* | 1/2012 | Talavasek | B62K 25/04 |
| | | | 280/124.1 |
| 2012/0325605 A1* | 12/2012 | Talavasek | F16F 9/56 |
| | | | 267/64.15 |
| 2012/0326416 A1* | 12/2012 | Talavasek | F16F 9/3271 |
| | | | 280/283 |
| 2015/0239526 A1* | 8/2015 | Ishikawa | B62K 25/283 |
| | | | 280/6.152 |
| 2017/0080771 A1* | 3/2017 | Kirchner | B60G 17/08 |
| 2017/0274959 A1* | 9/2017 | Yoshida | F16F 9/346 |
| 2019/0101178 A1* | 4/2019 | Skognes | B60G 15/063 |
| 2019/0203798 A1* | 7/2019 | Cox | F16F 9/49 |
| 2020/0324852 A1* | 10/2020 | Kwaterski | B62K 25/286 |
| 2020/0378168 A1* | 12/2020 | Chen | E05F 3/12 |
| 2021/0033163 A1* | 2/2021 | Nakano | F16F 9/464 |
| 2021/0033164 A1* | 2/2021 | Barefoot | F16F 9/0245 |

\* cited by examiner

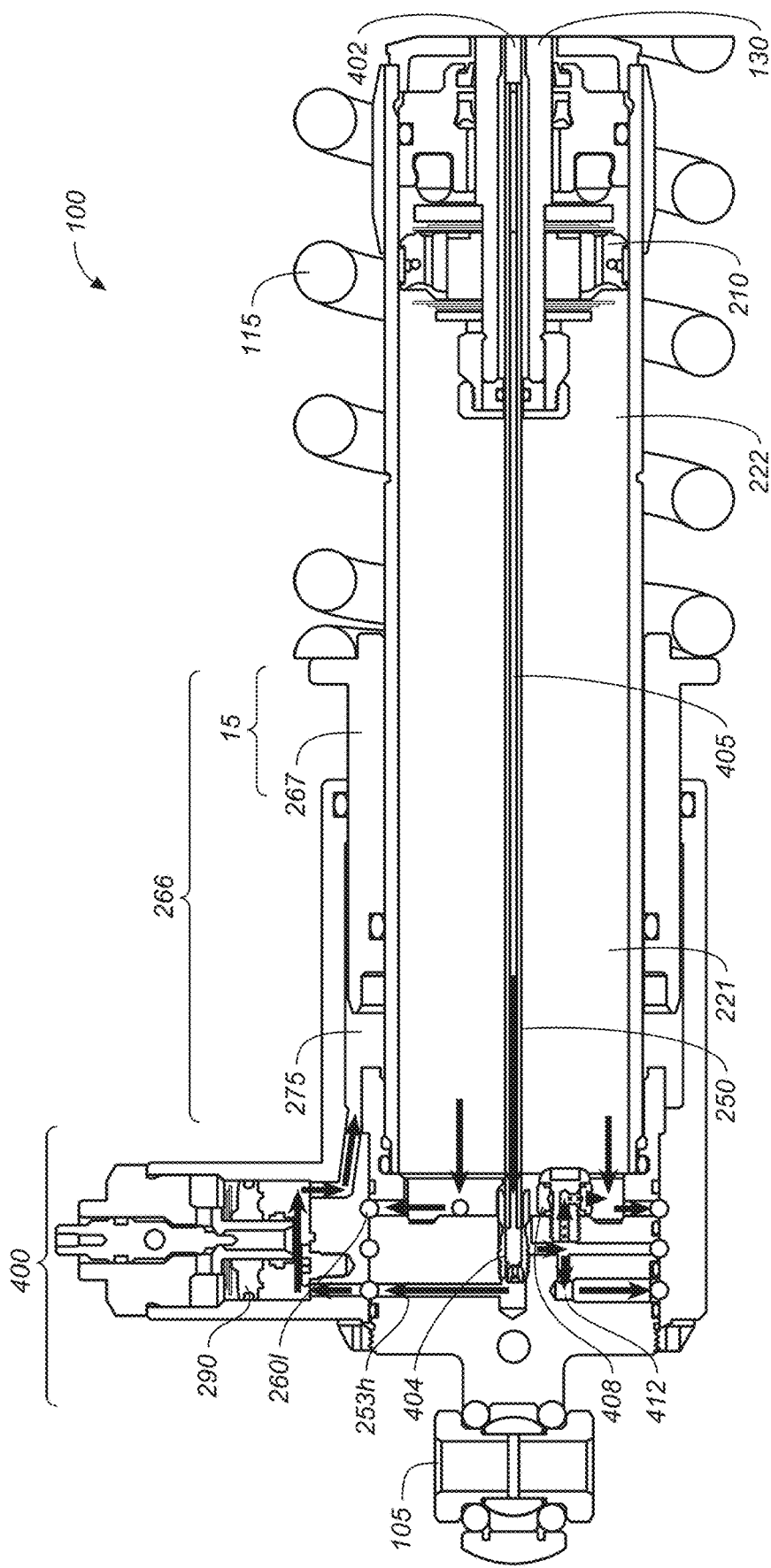

SHOCK ASSEMBLY WITH AUTOMATICALLY ADJUSTABLE RIDE HEIGHT

CROSS-REFERENCE TO RELATED APPLICATIONS (PROVISIONAL)

This application claims priority to and benefit of U.S. Provisional Patent Application No. 62/982,629 filed on Feb. 27, 2020, entitled "A SHOCK WITH AUTOMATICALLY ADJUSTABLE RIDE HEIGHT" by D'Orazio et al., and assigned to the assignee of the present application, the disclosure of which is hereby incorporated by reference in its entirety.

This application also claims priority to and benefit of U.S. Provisional Patent Application No. 63/110,204 filed on Nov. 5, 2020, entitled "A SHOCK WITH POPPET CONFIGURED AUTOMATICALLY ADJUSTABLE RIDE HEIGHT" by Randall et al., and assigned to the assignee of the present application, the disclosure of which is hereby incorporated by reference in its entirety.

FIELD OF THE INVENTION

Embodiments of the invention generally relate to methods and apparatus for use in vehicle suspension.

BACKGROUND OF THE INVENTION

Vehicle suspension systems typically include a spring component or components and a damping component or components that form a suspension to provide for a comfortable ride, enhance performance of a vehicle, and the like. For example, a hard suspension is important for a performance scenario while a soft suspension is better at providing a comfortable ride. However, in operation, the hardness or softness will change with the amount of weight being suspended. For example, a 100-pound rider on a motorcycle may have a shock assembly set to a softer setting to provide a comfortable ride. However, when a 300-pound rider rides the same motorcycle with the same setting, the shock assembly would likely have a much shorter length of available travel. Similarly, if the shock assembly was set up for the heavier rider, it would be in an extremely hard setting if the vehicle was used by the lighter rider. Thus, the heavier rider would need to change components of (or the entirety of) the shock assembly to obtain performance characteristics similar to the lighter rider and vice-versa.

BRIEF DESCRIPTION OF THE DRAWINGS

FIG. 4E is a section view of the shock assembly having the tube-in-shaft pump assembly spring and valve configuration riding high in a compression stroke, shown in accordance with an embodiment.

Figure 1A:
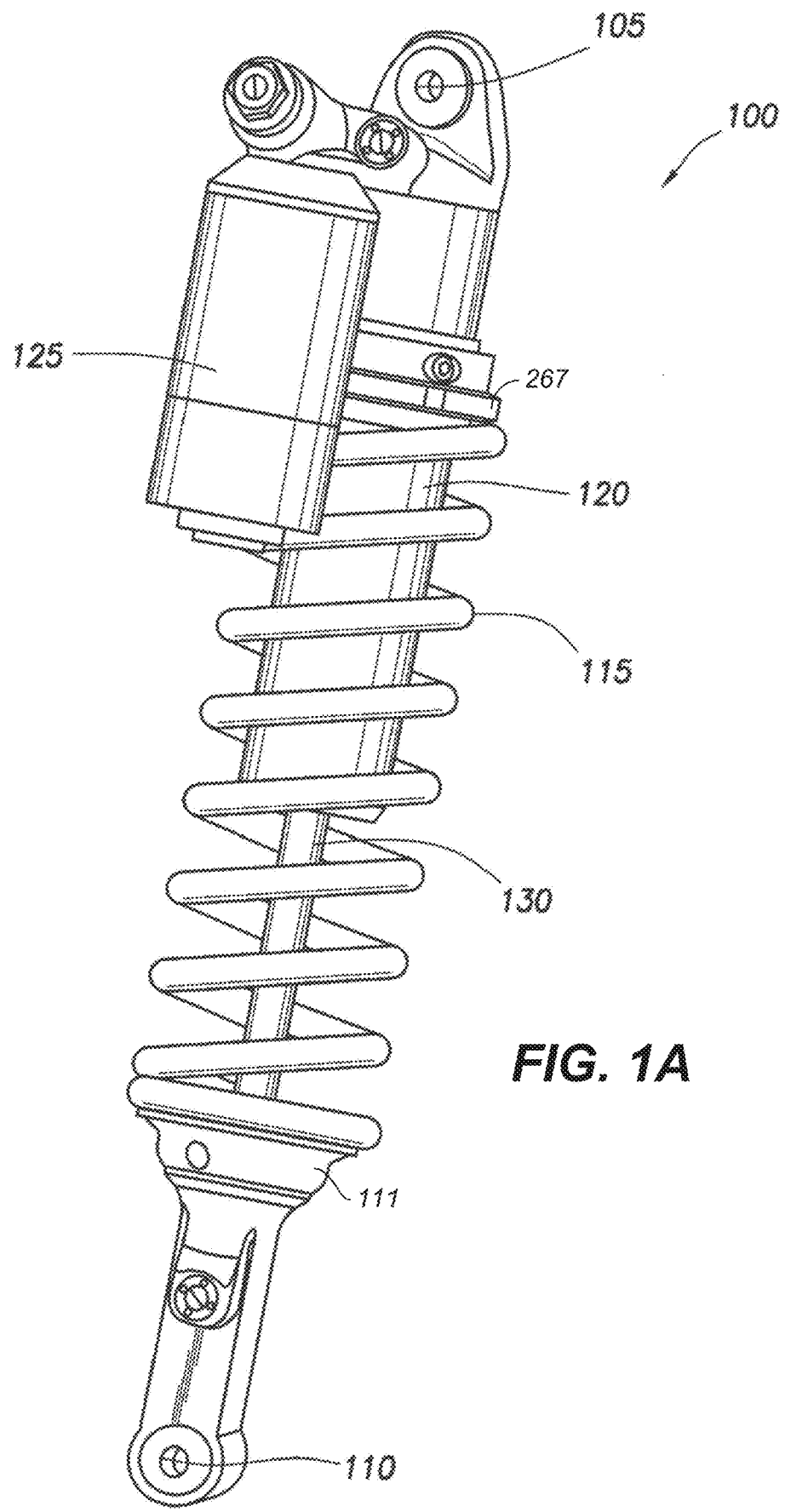
FIG. 1A is a perspective view of a shock assembly having an automatic ride height adjustment assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Terms

In the following discussion, the term ride height refers to a distance between a portion of a vehicle and the surface across which the vehicle is traversing. For example, one or more suspension components will be coupled with a portion of a wheel(s) (or ski, track, hull, etc.) retaining assembly. In normal operation, the lowest point of the wheel will be in contact with the surface, while a shock assembly and/or other suspension components will be coupled between the wheel retaining assembly and the vehicle (often coupled with a portion of the vehicle frame). The ride height is established by the geometries of the shock assembly and/or other suspension components, the wheel retaining assembly, the wheel and tire profile, and the like.

Often, ride height can be based on one or more of a number of different measurements such as, but not limited to, a distance between a part the vehicle and the ground, a measurement between the top of a tire on the wheel and the wheel well there above, etc.

In the following discussion, the term initial SAG settings or "SAG" refers to a ride height based on the compression of one or more suspension dampers of the suspension system for a vehicle under its normal load configuration (e.g., with a rider/driver and any initial load weight). Once the SAG is established for a vehicle, it will be the designated ride height of the vehicle, until and unless the SAG is changed. Often, SAG is initially established by a manufacturer. For example, an unloaded motorcycle may have an initially assembled suspension ride height ranging from 30-38 inches from ground to saddle. The manufacturer will then set the manufacturer SAG for the vehicle based on a use category, a user weight/height range, the performance envelope, and the like.

In one embodiment, for example, the manufacturer could set the SAG for a 34-inch ride height (a middle of the performance envelope) based on a rider with a weight of 150 lbs. This would mean that unencumbered, the motorcycle would have a seat height that was higher than 34 inches of ride height (such as for example, a seat height of 38 inches). However, when a 150 lb. rider sits on the motorcycle, the suspension would compress and the motorcycle would be at the SAG ride height of 34 inches.

In one embodiment, an owner can modify the SAG to designate a new normal ride height. The SAG could be modified based on a vehicle use purpose, load requirements that are different than the factory load configuration, a change in tire size, a performance adjustment, aesthetics, a height of the user, and the like. For example, if the user wanted to have a lower ride height, they could reduce the SAG to 32 inches. In contrast, if the user wanted a higher ride height, they could increase the SAG to 36 inches.

In one embodiment, the owner could modify one or more suspension components to achieve the SAG. For example, if the rider weighed 180 lbs., when the rider sat on the motorcycle, the ride height would be lower than the 34 inches. As such, the rider would adjust one or more of the suspension components to return the motorcycle to the 34-inch SAG.

In one embodiment, the vehicle will have SAG settings resulting in a pre-established ride height. For example, a truck (side-by-side, car, or the like) may have a pre-established SAG based on an expected load (e.g., a number of passengers, cargo requirements, etc.

Regardless of the vehicle type, in a static properly loaded situation, the ride height of the vehicle should be at or about the SAG. In contrast, while in motion, the ride height will change as the vehicle travels over the surface, and while the suspension system is used to reduce the transference of any input forces received from the surface to the rest of the vehicle, another goal of the suspension system is to continually attempt to return the vehicle to its proper SAG.

However, when additional weight is added to the vehicle, the suspension and/or shock assembly will be compressed, and the vehicle ride height will be less than the SAG.

For example, if a vehicle is loaded with an additional 500 lbs. of cargo in the rear, the extra 500-pound load will cause shock assembly compression (and the like) thereby causing the vehicle to ride lower in the rear. In general, this lower rear ride height, or compressing of the rear suspension, will move the vehicle out of SAG and change the vehicle geometry, e.g., cause a slant upward from rear to front. While the vehicle sensors described herein can identify the out of SAG situation, often, these changes can also be visually identified by a reduction in space between the wheel and the wheel well of the rear wheel as compared to space between the front wheels and wheel wells on the vehicle, or by the angle of the vehicle.

In one embodiment, the additional load will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, when the weight is added to the vehicle, if it is not centered, it will not only cause a change in the front or rear SAG (depending upon the load location fore or aft), but will also cause SAG changes that will differ between the left and right side of the vehicle (again depending upon the load location and this time whether the load is heavier on the right or left side of the vehicle centerline).

For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of issues including, but not limited to: steering problems, suspension bottom out, loss of control, tire blowout, and vehicle rollover.

Overview

The present embodiments utilize a fluid chamber of a spring preload piston assembly of the suspension to allow the ride height to be changed back toward the SAG while on the fly, e.g., while the vehicle is in operation. In one embodiment, the ride height adjustment is automatically made by utilizing a tube in the shaft acting as part of a pump assembly to adjust the amount of fluid within the fluid chamber of the spring preload piston assembly while the suspension is in operation. In general, when fluid is added to the fluid chamber the length of the spring preload piston assembly (and thus the length of the shock assembly) is increased causing an increase in ride height. In contrast, when fluid is removed from the fluid chamber, the length of the spring preload piston assembly (and thus the length of the shock assembly) is reduced causing a decrease in ride height.

In one embodiment, the system can be passive and/or semi-active. For example, in the passive case, the preload system bleeds to a fluid reservoir through tunable orifice. In the semi-active case, a pressure relief valve sets ride height and allows for rapid fluid dump (e.g., providing a large fluid path for the release of fluid from the fluid chamber to reduce the length of the spring preload piston assembly and lowering the vehicle) or system lockout to prevent system bleed down (e.g., maintaining the fluid in the fluid chamber to maintain the length of the spring preload piston assembly, and thus the ride height while the vehicle is parked, stopped, or the like). In one embodiment, the spring preload piston assembly reduces and/or eliminates a possibility of rebound adjustment. In one embodiment, the spring preload piston assembly provides no, or a very small change, to the damping values for different preloads.

Discussion

FIG. 1A is a perspective view of a shock assembly 100 having an automatic ride height adjustment assembly in accordance with an embodiment. The shock assembly 100 of FIG. 1A includes a helical or coil spring 115, a damper housing 120 with a main chamber and a damping piston coupled with a shaft 130 (shown in further detail herein), and an external fluid reservoir 125 having a floating piston and pressurized gas to compensate for a reduction in volume in the main chamber of the shock assembly as the shaft 130 moves into the damper body.

Figure 1B:
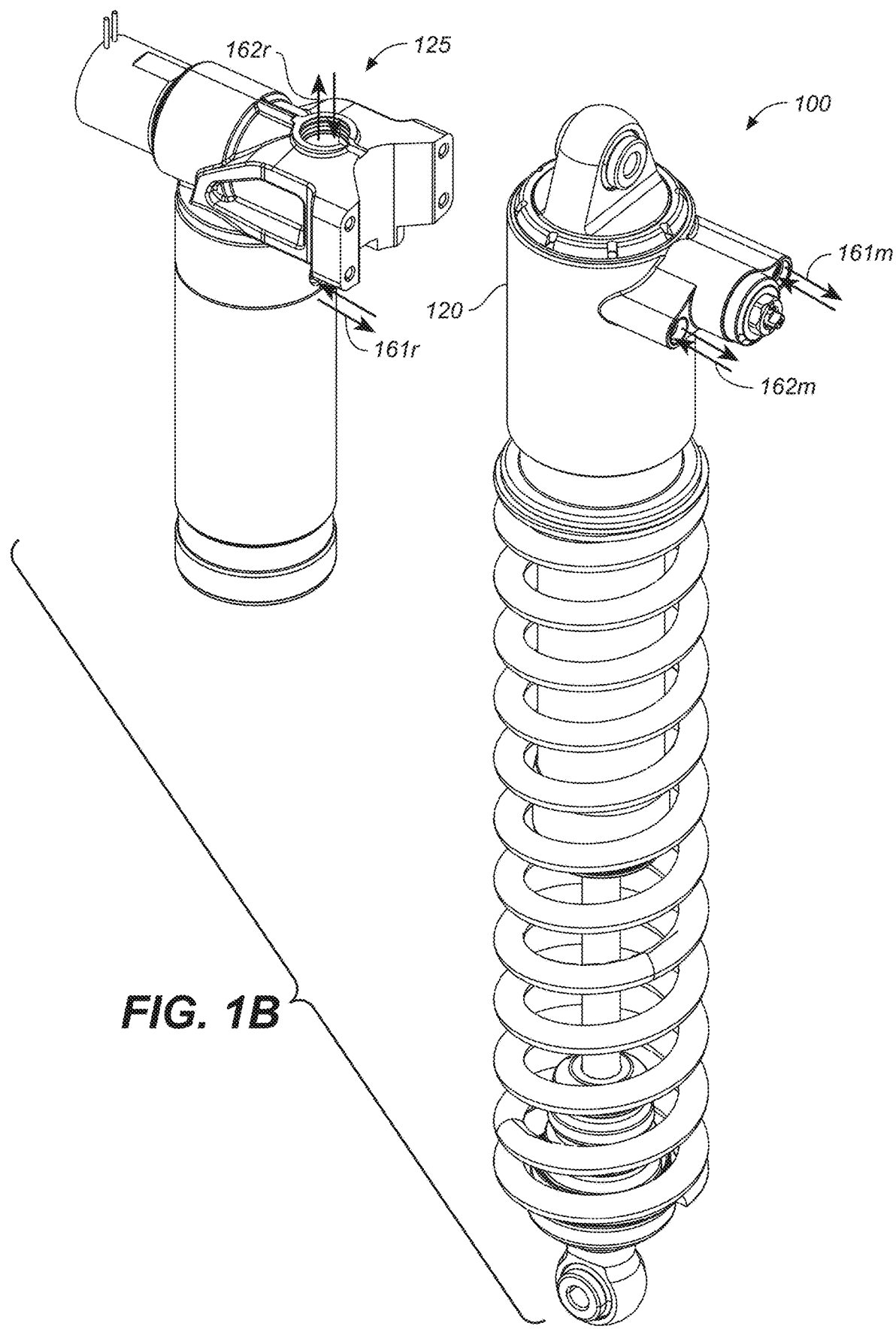
FIG. 1B is a perspective view of a shock assembly having an automatic ride height adjustment assembly illustrating a number of flow ports, in accordance with an embodiment.

FIG. 1B is a perspective view of a shock assembly 100 having an automatic ride height adjustment assembly, external fluid reservoir 125, and the associated flow ports therebetween (e.g., flow port 161r, flow port 161m, flow port 162r, and flow port 162m), in accordance with an embodiment. In other words, FIG. 1B is an example of one embodiment for fluid communication between the main chamber of the damper and the external fluid reservoir 125.

In one embodiment, fluid communication between the main chamber 220 (as shown at least in FIG. 2A) within damper housing 120 and the external fluid reservoir 125 may be via a flow channel including an adjustable needle valve. In one embodiment, flow port 162m is a rod displacement flow to the base valve. In one embodiment, flow port 161m connects to external fluid reservoir 125 on an IFP pressure side of a base valve. In one embodiment, flow port 161m is configured with an in that uses a low-pressure inlet check and an out that is configured as a high-pressure blowoff.

In one embodiment, two separate hoses are used to connect each of the flow ports, e.g., a first hose to connect flow port 161m from shock with flow port 161r of reservoir and a second hose to connect flow port 162m from shock with flow port 162r of reservoir. In one embodiment, when the external fluid reservoir 125 is in a piggyback configuration, the porting is internal.

Referring again to FIG. 1A, in its basic form, the damper works in conjunction with the coil spring 115 and controls the speed of movement of the shaft 130 by metering incompressible fluid from one side of the damper piston (e.g., damping piston 210 of FIG. 2B) to the other as the damper travels through the main chamber, and additionally metering fluid flow from the main chamber to the external fluid reservoir 125, during a compression stroke (and in reverse during the rebound or extension stroke).

In one embodiment, shock assembly 100 includes spring retaining end 267. In one embodiment, spring retaining end 267 is part of the automatically adjustable ride height assembly. Coil spring 115 is disposed surrounding the external surface of damper housing 120. In the single spring embodiment of FIG. 1A, coil spring 115 has one end abutting spring retaining end 267 and another end coupled to a lower flange 111.

In one embodiment, shock assembly 100 also includes upper eyelet 105 and lower eyelet 110 for coupling shock assembly 100 with a suspension system. The upper eyelet 105 and lower eyelet 110 are used for mounting one end of the shock assembly to a static portion of the vehicle and the other end of the shock assembly to a dynamic portion of the wheel(s) (or ski, track, hull, etc.) retaining assembly. Although eyelets are shown, it should be appreciated that the mounting systems may be bolts, welds, or the like, the use of eyelets is provided as one embodiment and for purposes of clarity.

Although the eyelets are labeled as upper eyelet 105 and lower eyelet 110, this is providing as one embodiment, and for purposes of defining relative motion of one or more of the components of shock assembly 100. Thus, it should be appreciated that in one embodiment, (such as an inverted scenario) the mounting of shock assembly 100 could be with the upper eyelet 105 being at a lower point (such as closer to the wheel retaining assembly) while the lower eyelet 110 would actually be at a higher point on the vehicle than upper eyelet 105 (e.g., such as at the frame of the vehicle).

In operation, shock assembly 100 is initially configured with a given preload and overall length (e.g., the established SAG). The overall length is the distance between upper eyelet 105 and lower eyelet 110. The preload is defined by the distance between spring retaining end 267 and lower flange 111, and more specifically the compression of coil spring 115. In general, there is more preload when spring retaining end 267 is moved closer toward lower eyelet 110 (e.g., compressing coil spring 115) and less preload when spring retaining end 267 is moved closer to upper eyelet 105 (e.g., increasing the distance between spring retaining end 267 and lower flange 111).

In one embodiment, the automatically adjustable ride height assembly has a minimum length and the resting length of coil spring 115 applies a pressure to spring retaining end 267 and lower flange 111 to maintain a length of shaft 130 extending from damper housing 120 and thus the overall length of shock assembly 100. When the suspension encounters a bump, shock assembly 100 enters a compression stage where distance between upper eyelet 105 and lower eyelet 110 is reduced as the coil spring 115 is compressed and the damper piston and shaft 130 move through the main chamber toward upper eyelet 105. After the compression stage, shock assembly 100 enters a rebound stage where coil spring 115 provides a pressure on spring retaining end 267 and lower flange 111 causing the damper piston and shaft 130 to move back through the main chamber toward lower eyelet 110 as shock assembly 100 returns to its resting size (e.g., its SAG).

It should be appreciated that the automatically adjustable ride height assembly discussed herein could be incorporated into a shock assembly 100 like FIG. 1A, or in another embodiment, into a shock assembly 100 with more, fewer, or different components than those shown in FIG. 1A such as, but not limited to, single spring, multi spring, or air spring shocks, a shock assembly without a remote external fluid reservoir 125, and the like.

Moreover, the automatically adjustable ride height capability disclosed herein could be used on one or more shock assemblies of different types, and in an assortment of vehicles such as, but not limited to bicycles, ebikes, motorcycles, all-terrain vehicles (ATV), Side-by-Sides, utility vehicles (UTV), snowmobiles, scooters, recreational off-highway vehicles (ROV), multipurpose off-highway utility vehicles (MOHUV), personal watercrafts (PWC), and the like.

Figure 2A:
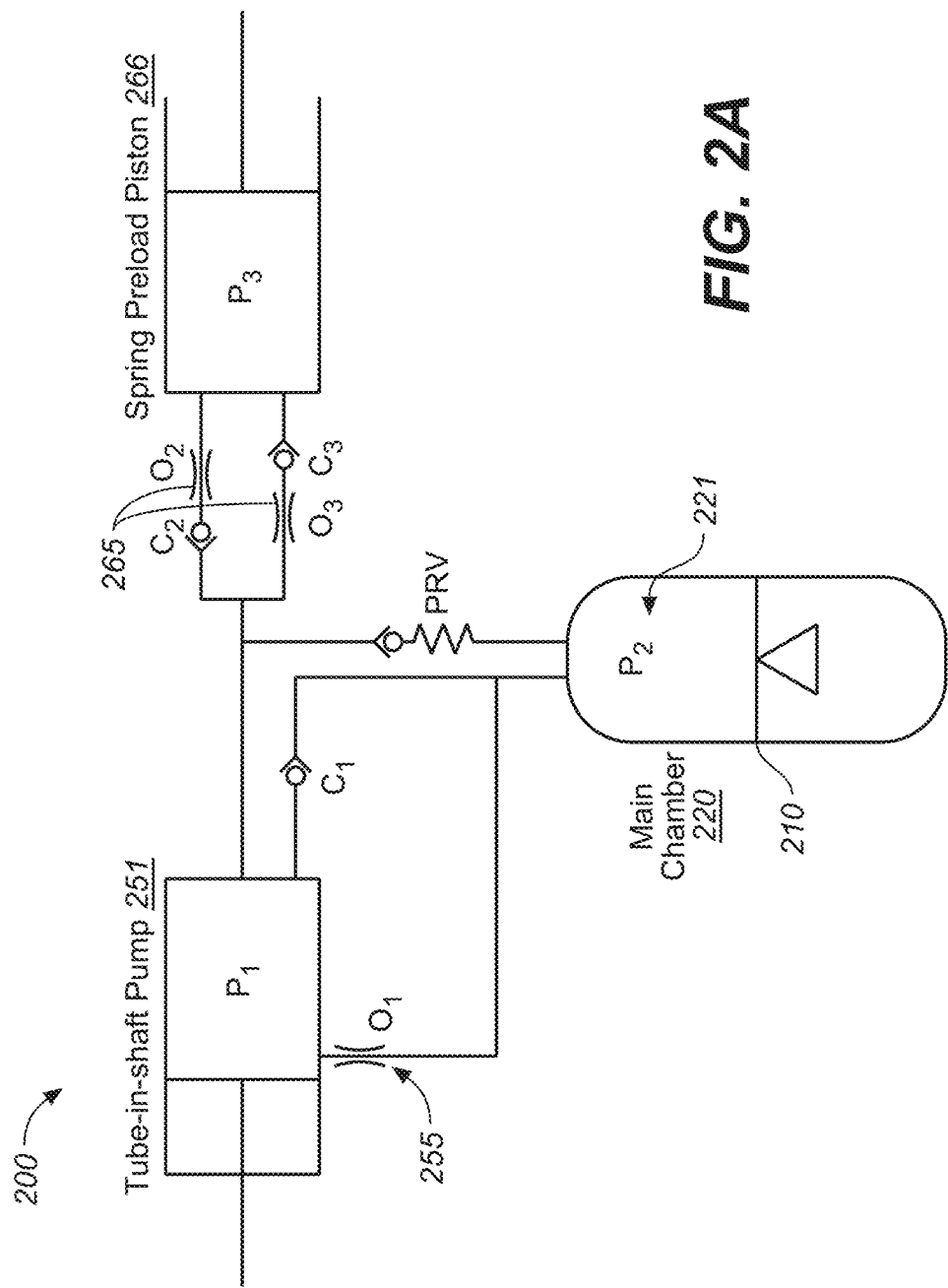
FIG. 2A is a schematic diagram of the operation of a shock assembly having an automatic ride height adjustment assembly, in accordance with an embodiment.

FIG. 2A is a schematic diagram 200 of shock assembly 100 with an automatic ride height adjustment assembly shown in accordance with an embodiment. In one embodiment, schematic diagram 200 includes main chamber 220 within damper housing 120 (of FIG. 1A), a tube-in-shaft pump assembly 251, and a spring preload piston assembly 266.

In one embodiment, main chamber 220 includes a damping piston 210 and a compression side 221 having a base valve pressure P2.

In one embodiment, tube-in-shaft pump assembly 251 includes a pump tube 250 with an intake/exhaust port(s) 255 opening therein. In one embodiment, the pump tube 250 in conjunction with the damping piston 210 and shaft 130 forms the tube-in-shaft pump assembly 251 when damping piston 210 and shaft 130 move during compression and/or rebound.

In one embodiment, spring preload piston assembly 266 includes tunable orifice(s) 265. In one embodiment, the tunable orifice(s) 265 could be combined for initial tuning. In one embodiment, the tunable orifice(s) 265 could be separated for initial tuning. In one embodiment, spring preload piston assembly 266 also includes one or more check valve(s) 260.

Figure 2B:
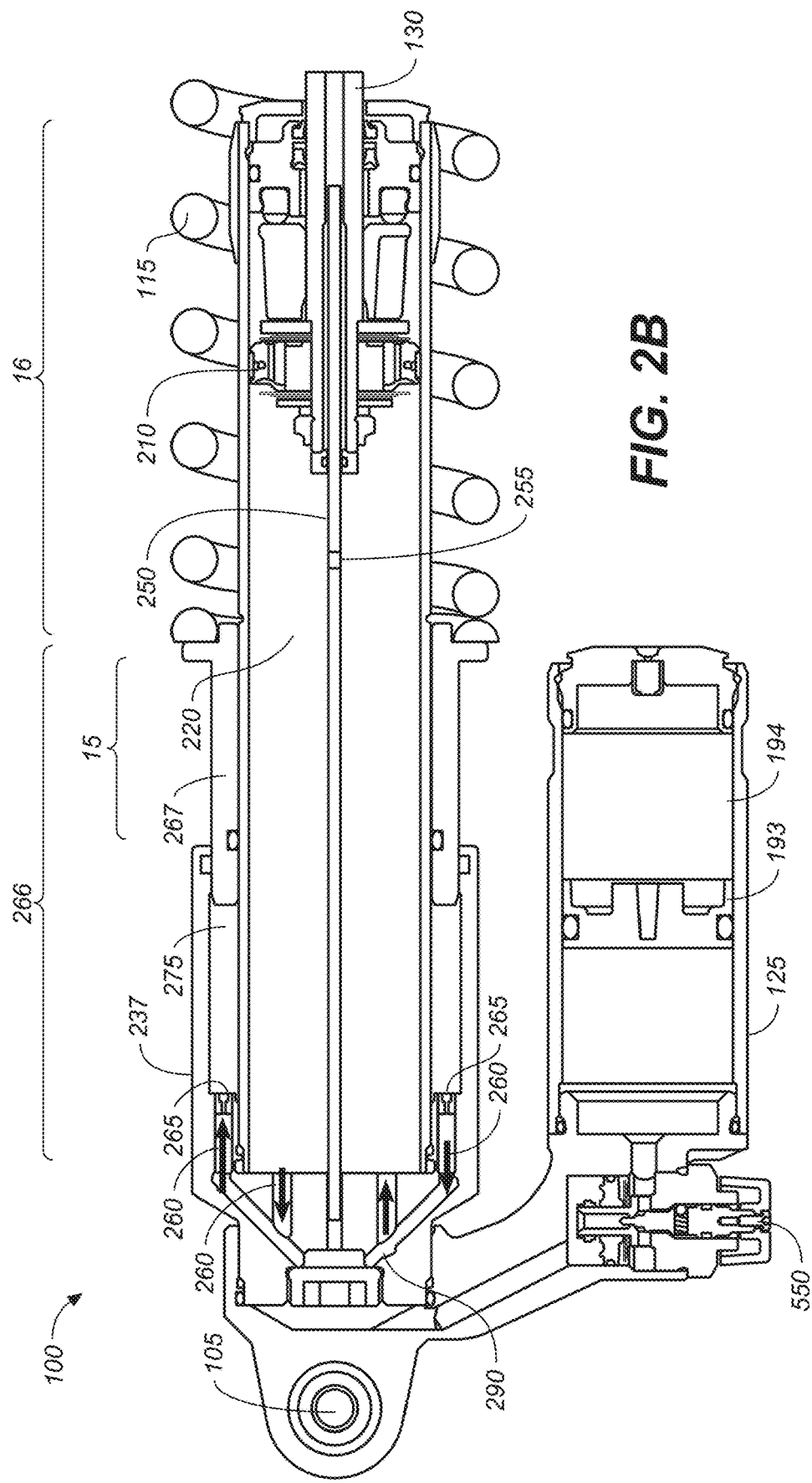
FIG. 2B is a section view of a shock assembly in a configuration illustrated in FIG. 2A, in accordance with an embodiment.

FIG. 2B is a section view of a shock assembly 100 based on the schematic diagram 200 of FIG. 2A shown in accordance with an embodiment. In one embodiment, shock assembly 100 includes the components described in FIG. 1A and discloses one or more additional components that are visible in the section view.

In the section view, shock assembly 100 includes a main chamber 220 within damper housing 120, a damping piston 210 fixed to shaft 130, a pump tube 250 with an intake/exhaust port(s) 255 opening therein, a spring preload piston assembly 266, and an optional external fluid reservoir 125.

In one embodiment, the damping piston 210 and shaft 130 are axially movable toward or away from upper eyelet 105 within main chamber 220 axially along pump tube 250. For example, during compression, the damping piston 210 and shaft 130 move axially through main chamber 220 toward upper eyelet 105. In contrast, during rebound, the damping piston 210 and shaft 130 move axially through main chamber 220 away from upper eyelet 105.

In one embodiment, the damping piston 210 is equipped with fluid paths therethrough to permit incompressible fluid within the main chamber 220 to be metered therethrough during the compression and/or rebound movement. For example, in the compression stroke, at least a portion of fluid within main chamber 220 utilizes the fluid paths through damping piston 210 to move from a compression side 221 of main chamber 220 to the rebound side 222 of the main chamber 220. In contrast, during a rebound (or extension) stroke, at least a portion of fluid within main chamber 220 utilizes the fluid paths through damping piston 210 to move from the rebound side 222 to the compression side 221.

In one embodiment, shock assembly 100 can also include one or more bypasses that allow fluid to flow around the piston between the compression side 221 and the rebound side 222 of the main chamber 220 during at least a portion of the compression and/or rebound stroke. Additional information regarding the configuration and operation of a bypass is described in U.S. Pat. No. 8,857,580 which is entirely incorporated herein by reference.

In one embodiment where there is an external fluid reservoir 125, as shown in FIGS. 1B and 2B, during at least a portion of the compression and/or rebound stroke fluid can also move through a flow path from the main chamber 220 into the external fluid reservoir 125, thereby causing a reservoir floating piston 193 to compress a gas chamber 194 in the external fluid reservoir 125. A configuration of a side reservoir, including a floating piston, is described in U.S. Pat. No. 7,374,028 which patent is entirely incorporated herein by reference.

In one embodiment, the ride height adjustment assembly includes components such as, a pump tube 250, a spring preload piston assembly 266, an intake/exhaust port(s) 255, a check valve 260, a tunable orifice 265, and a relief valve 290.

Spring Preload Piston Assembly

With reference still to FIG. 2B, in one embodiment, spring preload piston assembly 266 includes a housing 237, a fluid chamber 275 within the housing 237, and a spring retaining end 267 that is telescopically coupled with housing 237. In one embodiment, damper housing 120, housing 237, and spring retaining end 267 will fluidly seal a top portion of the spring preload piston assembly 266 to form a fluid chamber 275. In one embodiment, the spring preload piston assembly 266 may include more or fewer components (such as internal cylinders, seals, O-rings, or the like) to perform the operations described herein.

In one embodiment, the housing 237 and fluid chamber 275 within the housing 237 of spring preload piston assembly 266 are in a fixed location with respect to damper housing 120. In one embodiment, the spring retaining end 267 is able to move axially along damper housing 120 as it extends from or retracts into housing 237. Thus, as fluid is introduced into the fluid chamber 275, the spring retaining end 267 will be driven toward the lower eyelet 110.

For example, as fluid is applied through pump tube 250, the fluid will flow into fluid chamber 275 and ultimately force spring retaining end 267 to move with respect to housing 237 in a direction along the axis of damper housing 120 toward the lower eyelet 110. In one embodiment, fluid can enter or leave fluid chamber 275 via the fluid paths controlled by check valve(s) 260 and/or tunable orifice(s) 265.

In one embodiment, check valve 260 is a ball spring check valve with flow directions as shown. However, it should be appreciated that check valve 260 could be another type of valve such as an intelligent quick switch (IQs), a stepper motor adjustable valve, an electronic valve, a gate valve, or the like.

In one embodiment, the check valve 260 either allows fluid flow in both directions (e.g., open) or only allows fluid to flow in one direction (e.g., closed). In so doing, even if the check valve 260 is closed, when the shock assembly 100 is under significant load changes, the fluid flow is only closed in the direction of stopping fluid flow out of fluid chamber 275. Thus, in one embodiment, even when the check valve 260 is closed, the fluid can flow from main chamber 220 into fluid chamber 275.

In one embodiment, when the amount of fluid in fluid chamber 275 changes, the exposed length 15 of spring retaining end 267 also changes thereby increasing or decreasing the length of the spring preload piston assembly 266. This increase or decrease in the length of spring preload piston assembly 266 will result in an increase or decrease in the overall length of shock assembly 100 resulting in a change to the ride height.

For example, when fluid is pumped into fluid chamber 275, spring retaining end 267 is hydraulically pushed axially along the damper housing 120 toward lower eyelet 110 increasing the exposed length 15 of spring retaining end 267. This increase in the exposed length 15 of spring retaining end 267 will translate to an increase in the length of the spring preload piston assembly 266.

In one embodiment, increasing the length of the spring preload piston assembly 266 will increase the overall length of shock assembly 100 resulting in a ride height increase. In one embodiment, since the ride height increase is based on the overall lengthening of shock assembly 100, any damping settings and/or the preload of shock assembly 100 will either not be affected or only be slightly affected. As such, the performance of the shock assembly 100 will also remain relatively unmodified.

In contrast, when fluid is released from fluid chamber 275, spring retaining end 267 would be pushed by the force of spring 115 axially along the damper housing 120 toward upper eyelet 105 and into the fluid chamber 275 reducing the exposed length 15 of spring retaining end 267. This decrease in the exposed length 15 of spring retaining end 267 will translate to a decrease in the overall length of the spring preload piston assembly 266.

In one embodiment, decreasing the length of the spring preload piston assembly 266 will decrease the overall length of shock assembly 100 resulting in a ride height reduction. In one embodiment, since the ride height reduction is based on the reduction to the overall length of shock assembly 100, any damping settings and/or the preload of shock assembly 100 will either not be affected or only be slightly affected. As such, the performance of the shock assembly 100 will also remain relatively unmodified.

Tube-In-Shaft Pump Assembly with Intake/Exhaust Port(s) 255

In one embodiment, tube-in-shaft pump assembly 251 includes a pump tube 250 and a pumping action provided by the compression and rebound motion of damping piston 210 and shaft 130. In one embodiment, pump tube 250 is used to pump fluid into fluid chamber 275 or draws fluid from the main chamber and/or out of fluid chamber 275. In one embodiment, the fluid is pumped from the pump tube 250 into the fluid chamber 275 via the fluid paths controlled by check valve(s) 260 and/or tunable orifice(s) 265.

In one embodiment, the pump tube 250 is located along the length of main chamber 220. In one embodiment, damping piston 210 and shaft 130 will move along the length of pump tube 250 during rebound and compression strokes. In one embodiment, pump tube 250 includes at least one intake/exhaust port(s) 255. In one embodiment, the intake/exhaust port(s) 255 is an opening in the pump tube 250 that is uncovered when the damping piston 210 and shaft 130 are below the opening (e.g., closer to lower eyelet 110 as shown in FIG. 2B), and is closed when damping piston 210 and shaft 130 are covering thereover (e.g., as shown in FIG. 2D).

In one embodiment, the location of the intake/exhaust port(s) 255 on the pump tube 250 is set such that when the vehicle is static at the established SAG, the damping piston 210 will be approximately located thereover.

In one embodiment, based on the SAG defined location of the intake/exhaust port(s) 255 in the pump tube 250 with respect to the damping piston 210, when the vehicle is in operation, the intake/exhaust port(s) 255 is approximately half the time covered and half the time uncovered by the damping piston 210 at SAG ride height. In other words, intake/exhaust port(s) 255 is covered as the damping piston 210 and shaft 130 move toward the upper eyelet 105 in the compression stroke. In contrast, at some point in the rebound stroke when the damping piston 210 and shaft 130 move away from the upper eyelet 105 the intake/exhaust port(s) 255 would be uncovered.

In one embodiment, the pump tube 250 is filled with fluid and will pump the fluid into the fluid chamber 275 when the intake/exhaust port(s) 255 is covered during a compression stroke. In contrast, when the intake/exhaust port(s) 255 is uncovered, such as during a rebound stroke, the fluid will be drawn from the fluid chamber 275 and back into pump tube 250 (unless the check valve is closed which is discussed in further detail herein).

Thus, during operation of the vehicle in a normally configured state, e.g., at SAG, the intake/exhaust port(s) 255 tunes the ride height. If the damping piston 210 and shaft 130 are not covering the intake/exhaust port(s) 255, fluid is released through the intake/exhaust port(s) 255 and into the main chamber, if the damping piston 210 and shaft 130 are covering the intake/exhaust port(s) 255, the fluid is pumped up the pump tube 250 and into the fluid chamber 275. Thus, at SAG, the fluid would be pumped into fluid chamber 275 during a compression stroke once the damping piston 210 and shaft 130 cover the intake/exhaust port(s) 255, and would be released from the fluid chamber 275 during the rebound stroke after the damping piston 210 and shaft 130 uncover the intake/exhaust port(s) 255.

Riding Low

In one embodiment, when weight is added to the vehicle, the overall shock assembly 100 length is shortened at least at the location where the weight is added. This reduction in shock assembly 100 length will result in a lower ride height and the vehicle will no longer be in its SAG configuration.

In one embodiment, the shortening of the shock assembly 100 length, causes the damping piston 210 and shaft 130 to move up the pump tube 250 closer to the upper eyelet 105. As such, in a static situation, the intake/exhaust port(s) 255 will be covered by the damping piston 210 and shaft 130.

Figure 2C:
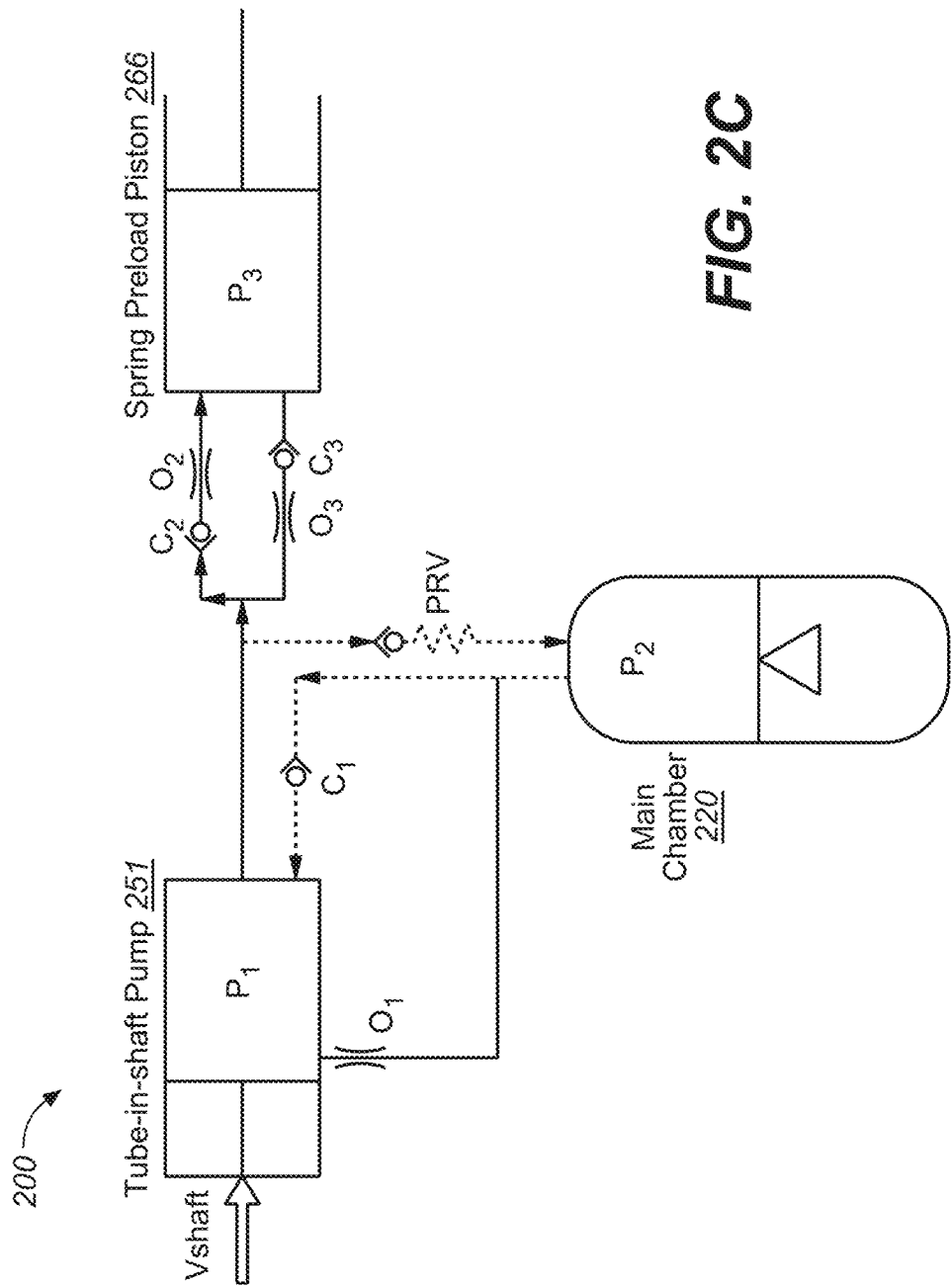
FIG. 2C is a schematic diagram of the operation of the shock assembly riding low in a compression stroke, in accordance with an embodiment.
Figure 2D:
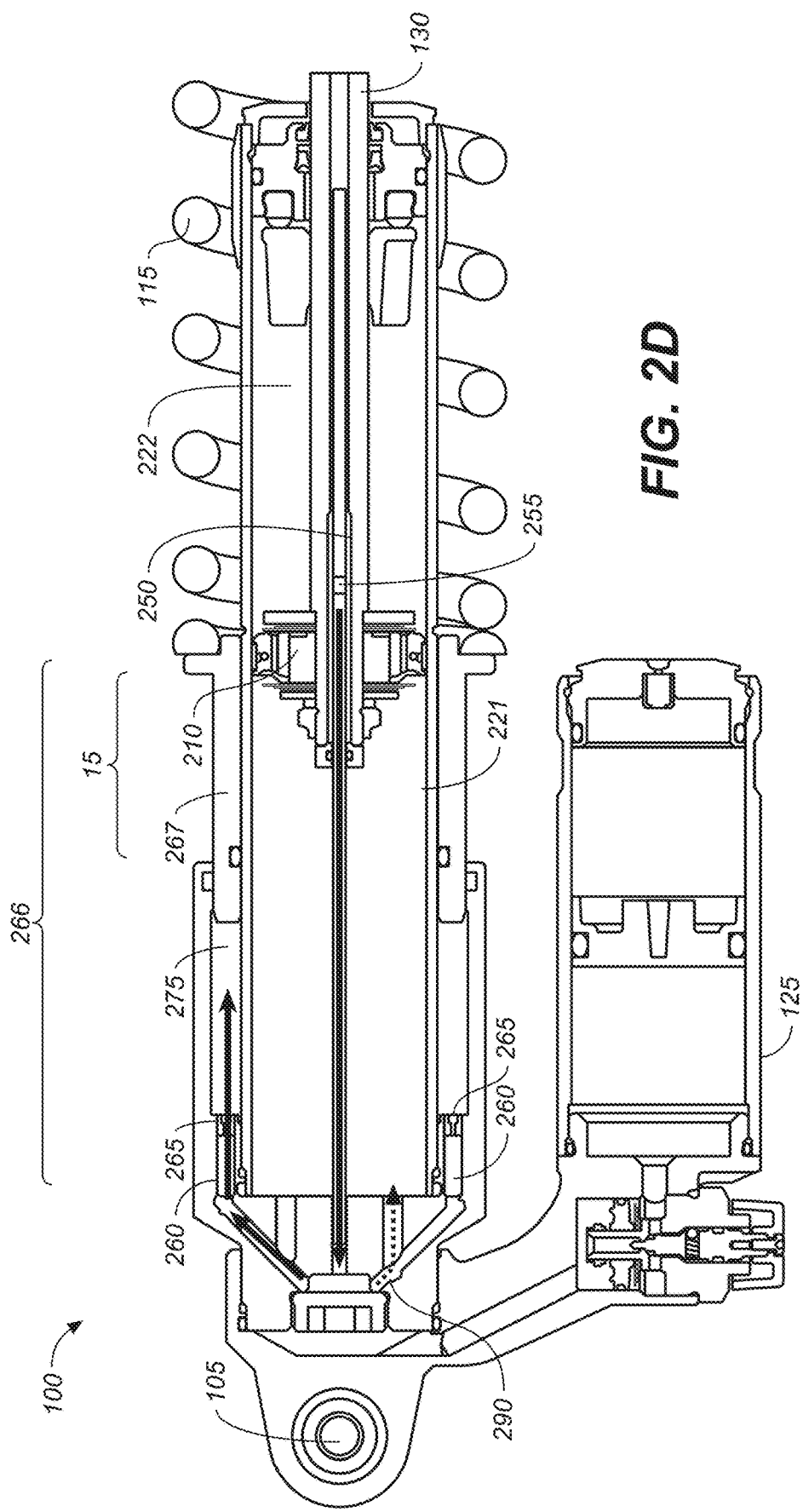
FIG. 2D is a section view of the shock assembly in a configuration illustrated in FIG. 2C, in accordance with an embodiment.

Referring now to FIG. 2C a schematic diagram of the shock assembly riding low in a compression stroke is shown in accordance with an embodiment. In FIG. 2C, the fluid volumes are shown for the tube-in-shaft pump assembly 251 (e.g., P1), the main chamber 220 compression side (e.g., P2), and the spring preload piston assembly 266 (e.g., P3).

In one embodiment of the low riding compression stroke (having either high or low shaft speed), the main chamber 220 compression portion 221 P2 can be low or high. The tube-in-shaft pump assembly 251 P1 will be less than the main chamber 220 compression portion 221 P2. The tube-in-shaft pump assembly 251 P1 will be less than or equal to the spring preload piston assembly 266 P3. In one embodiment, the Vshaft can also be low or high.

FIG. 2D is a section view of shock assembly 100 illustrating the operation of FIG. 2C during a compression stroke, in accordance with an embodiment. In one embodiment, the components of FIG. 2D are similar to those of FIG. 2B. Therefore, for purposes of clarity the component description will not be repeated, and instead, only the operational differences will be discussed. However, the discussion of the components of FIG. 2B is incorporated by reference in their entirety.

Figure 2E:
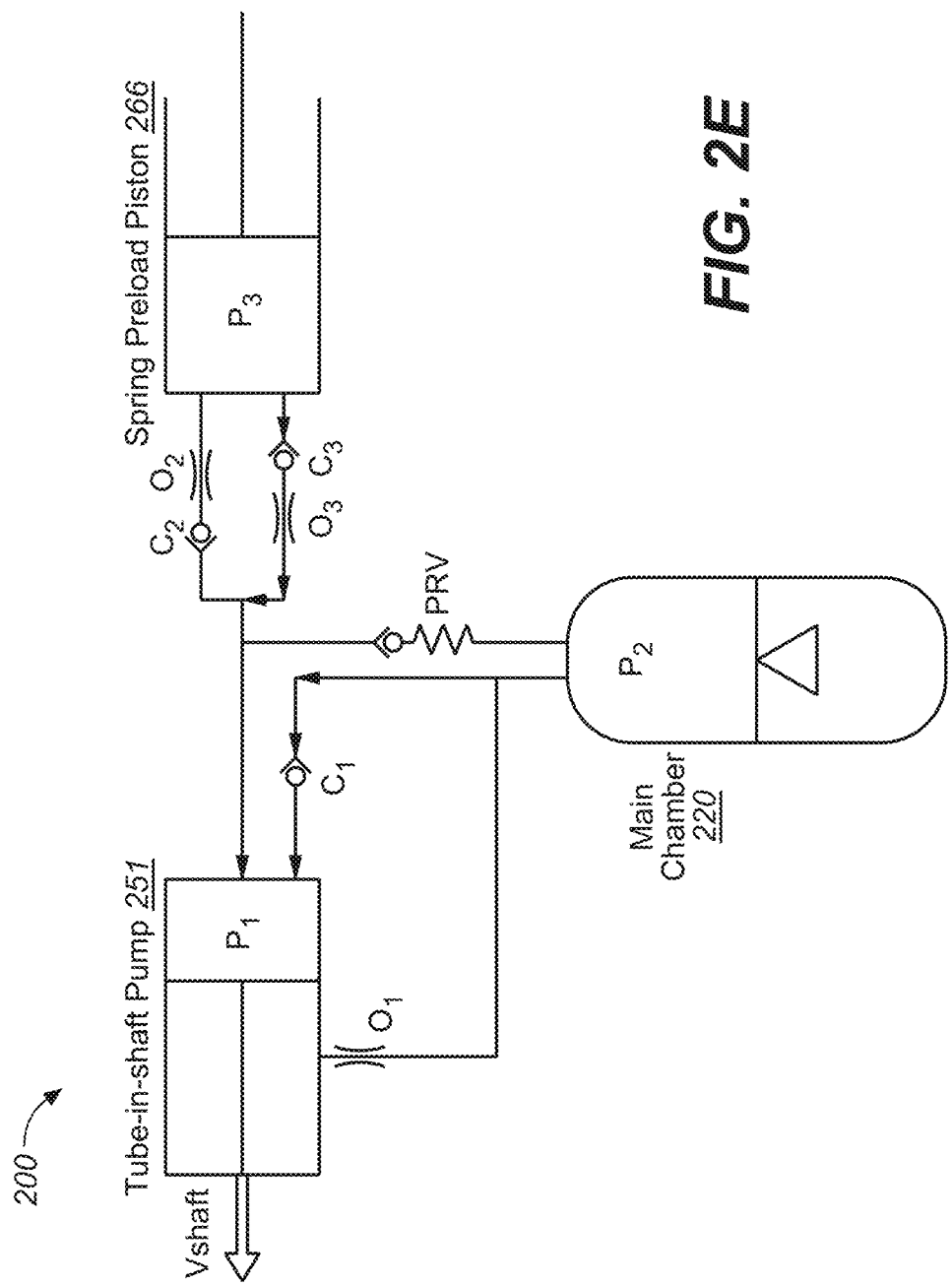
FIG. 2E is a schematic diagram of the operation of the shock assembly riding low in a rebound stroke, in accordance with an embodiment.

Referring now to FIG. 2E a schematic diagram of the shock assembly riding low in a rebound stroke is shown in accordance with an embodiment. In FIG. 2E, the fluid volumes are shown for the tube-in-shaft pump assembly 251 (e.g., P1), the main chamber 220 compression side (e.g., P2), and the spring preload piston assembly 266 (e.g., P3).

In one embodiment of the low riding rebound stroke (having either high or low shaft speed), the main chamber 220 compression portion 221 P2 is low. The tube-in-shaft pump assembly 251 P1 will be less than or equal to the main chamber 220 compression portion 221 P2. The tube-in-shaft pump assembly 251 P1 will be less than or equal to the spring preload piston assembly 266 P3. In one embodiment, the Vshaft can also be low or high.

Figure 2F:
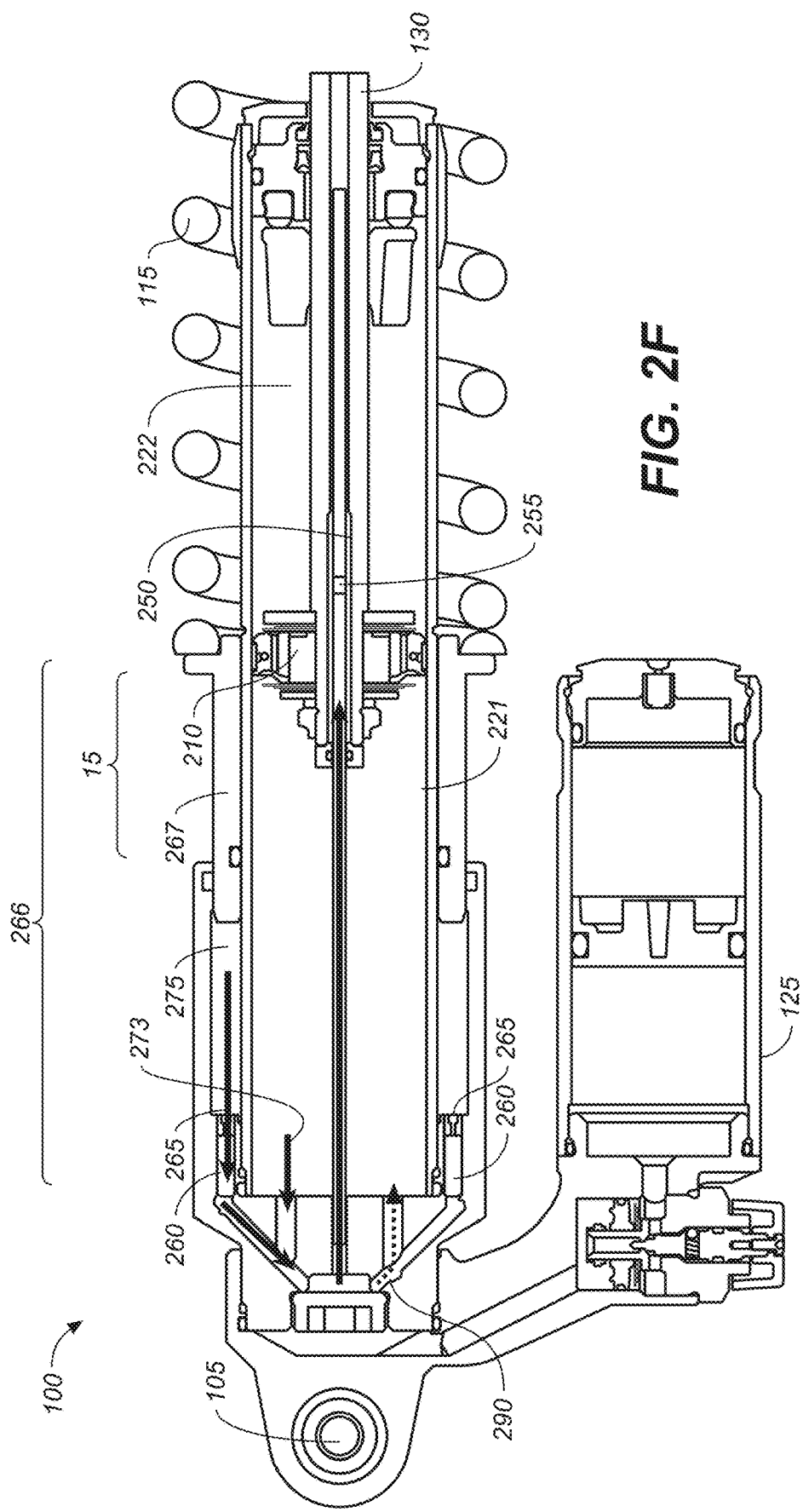
FIG. 2F is a section view of the shock assembly in a configuration illustrated in FIG. 2D, in accordance with an embodiment.

FIG. 2F is a section view of shock assembly 100 illustrating the operation of FIG. 2E during a compression stroke, in accordance with an embodiment. In one embodiment, the components of FIG. 2F are similar to those of FIG. 2B. Therefore, for purposes of clarity the component description will not be repeated, and instead, only the operational differences will be discussed. However, the discussion of the components of FIG. 2B is incorporated by reference in their entirety.

In one embodiment, of an example of a low riding scenario, the damping piston 210 and shaft 130 are covering the intake/exhaust port(s) 255. Therefore, during a compression stroke as shown in FIG. 2D, when the damping piston 210 and shaft 130 are covering the intake/exhaust port(s) 255 the fluid is pumped up the pump tube 250 and into the fluid chamber 275. This addition of fluid will cause the fluid chamber 275 to expand which will cause spring retaining end 267 to move axially along the damping chamber increasing the exposed length 15 of spring retaining end 267, and therefore, the overall length of spring preload piston assembly 266. This increase in the overall length of spring preload piston assembly 266 would increase the overall length of shock assembly 100. In other words, it would basically cause a virtual increase in the length of damper housing 120.

With reference now to FIG. 2F, since the shock is riding low, during some or all of the rebound stroke, the damping piston 210 and shaft 130 would continue to cover the intake/exhaust port(s) 255 for a majority of even all of the rebound stroke. In the case where the intake/exhaust port(s) 255 remains covered, in one embodiment, some amount of fluid would be drawn from the fluid chamber 275 to fill the pump tube 250 and an additional amount of fluid would be drawn from the main chamber 220 into the shaft pump tube 250 as shown by arrow 273.

At the next compression (again shown in FIG. 2D), the additional fluid that was added to the pump tube 250 from the main chamber 220, in addition to the amount of fluid withdrawn from the fluid chamber 275, would be pumped into fluid chamber 275, which would further expand the size of fluid chamber 275 and again cause the spring retaining end 267 to be hydraulically pushed axial outward once again increasing the overall length of shock assembly 100. By lengthening the shock assembly 100, the ride height would be increased again.

In one embodiment, the filling and pumping process would continue for each compression and rebound stroke. However, as the ride height increased, the rebound stroke (shown in FIG. 2F) would begin to spend more time uncovering the intake/exhaust port(s) 255. When the intake/exhaust port(s) 255 were uncovered by damping piston 210 and shaft 130, an amount of fluid would be released from the pump tube 250 and therefore from the fluid chamber 275.

In one embodiment, the pumping of more fluid into fluid chamber 275 than the drawing of fluid out of fluid chamber 275 would continue at an incrementally slower pace until the shock assembly 100 returned to SAG, at which point the pumping and releasing of fluid from fluid chamber 275 would again be back to an approximate equilibrium.

In one embodiment, once the SAG height is reached, if the vehicle is stopped or parked, the check valve 260 may be closed such that the fluid will not leak out of fluid chamber 275, and therefore the ride height will not "sink" over time even if the vehicle is parked.

In one embodiment, if the load was too heavy, the maximum size of fluid chamber 275 could be reached without the shock assembly 100 reaching SAG height. This could be due to the load causing a significant compression to spring 115 and thus the shortening of the axial length 16. In this example, once the maximum size (or capacity) of fluid chamber 275 was reached, more fluid would still be being pumped toward fluid chamber 275 through pump tube 250 than was being released by fluid chamber 275. However, since the size of fluid chamber 275 is maximized, in one embodiment, any additional fluid that is pumped toward the fluid chamber 275 would be released through the fluid relief valve 290.

In one embodiment, if the shock assembly 100 were to encounter a significant event causing a large compression, some amount of the fluid pumped through pump tube 250 would also be dumped through the fluid relief valve 290.

Riding High

In one embodiment, when weight is removed from the vehicle, the overall shock assembly 100 length is increased at least at the location where the weight was removed. This increase in shock assembly 100 length will result in a higher ride height and the vehicle will no longer be in its SAG configuration.

In one embodiment, the increase of the shock assembly 100 length, causes the damping piston 210 and shaft 130 to move down the pump tube 250 away from the upper eyelet 105. As such, in a static situation, the intake/exhaust port(s) 255 will be uncovered by the damping piston 210 and shaft 130.

Figure 3A:
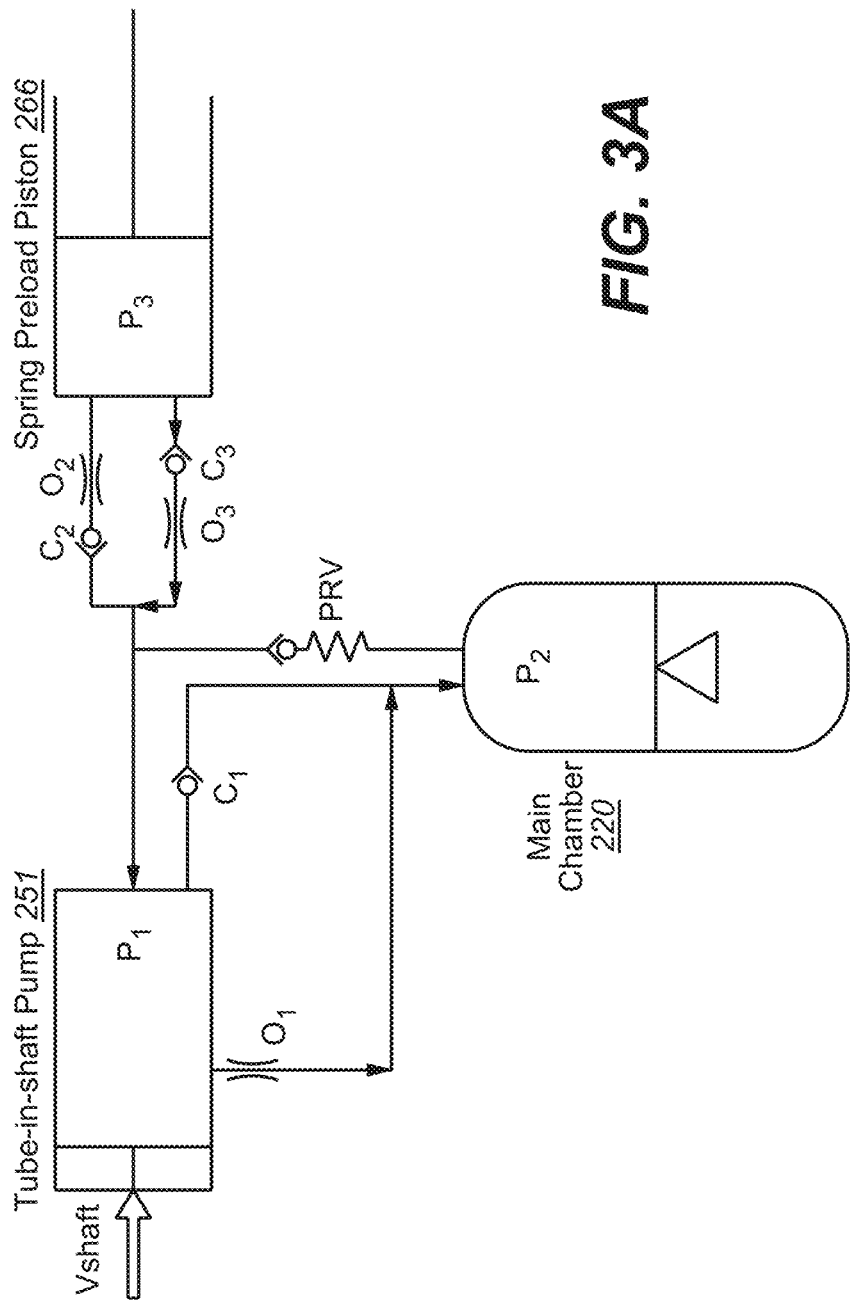
FIG. 3A is a schematic diagram of the operation of the shock assembly riding high in a compression stroke with a low shaft speed, in accordance with an embodiment.

Referring now to FIG. 3A a schematic diagram of the operation of the shock assembly riding high in a compression stroke with a low shaft speed, is shown in accordance with an embodiment. In FIG. 3A, the fluid volumes are shown for the tube-in-shaft pump assembly 251 (e.g., P1), the main chamber 220 compression portion (e.g., P2), and the spring preload piston assembly 266 (e.g., P3).

In one embodiment of the riding high compression stroke having a low shaft speed, the main chamber 220 compression portion P2 is low. The tube-in-shaft pump assembly 251 P1 will be equal to the main chamber 220 compression portion P2. The tube-in-shaft pump assembly 251 P1 will be less than or equal to the spring preload piston assembly 266 P3. In one embodiment, the Vshaft will also be low.

Figure 3B:
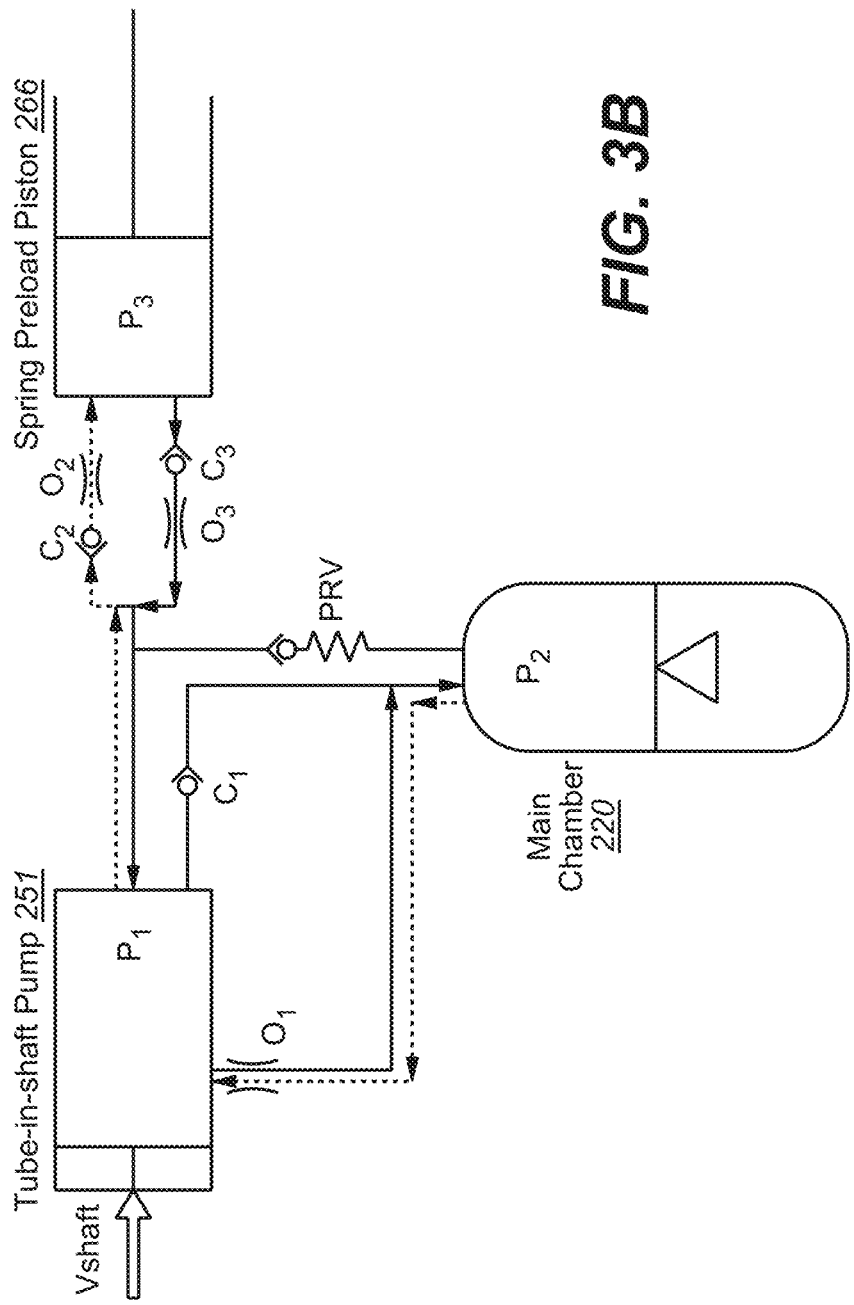
FIG. 3B is a schematic diagram of the operation of the shock assembly riding high in a compression stroke with a high shaft speed, in accordance with an embodiment.

FIG. 3B is a schematic diagram of the operation of the shock assembly riding high in a compression stroke with a high shaft speed shown in accordance with an embodiment. In FIG. 3B, the fluid volumes are shown for the tube-in-shaft pump assembly 251 (e.g., P1), the main chamber 220 compression portion (e.g., P2), and the spring preload piston assembly 266 (e.g., P3).

In one embodiment of the riding high compression stroke having a high shaft speed, the main chamber 220 compression portion P2 is high. The tube-in-shaft pump assembly 251 P1 will be equal to the main chamber 220 compression portion P2. The tube-in-shaft pump assembly 251 P1 will be less than or equal to the spring preload piston assembly 266 P3. In one embodiment, the Vshaft will also be high.

In one embodiment, if P2 is greater than P3, then P2 flows to P3 across O1, C1, and C2, O2.

In one embodiment, if P3 is greater than P2, then P3 flows to P2 across C3, O3, and O1.

In one embodiment, the flow state can depend upon the valving, velocity, spring settings, and the like.

Figure 3C:
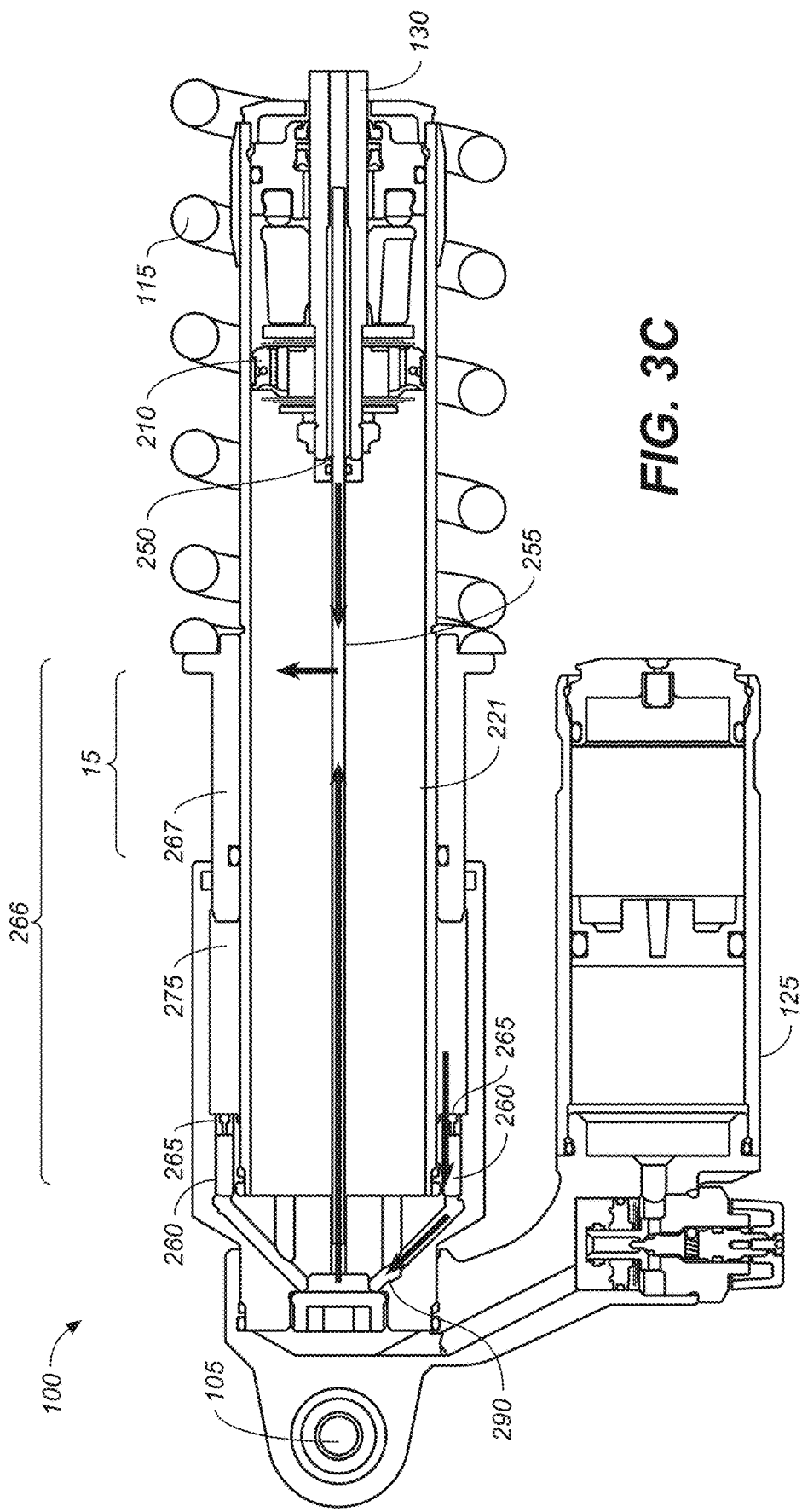
FIG. 3C is a section view of the shock assembly riding high in a configuration illustrated in FIGS. 3A and 3B, in accordance with an embodiment.

FIG. 3C is a section view of shock assembly 100 illustrating the operation of FIGS. 3A and 3B during a riding high compression stroke, in accordance with an embodiment. In one embodiment, the components of FIG. 3C are similar to those of FIG. 2B. Therefore, for purposes of clarity the component description will not be repeated, and instead, only the operational differences will be discussed. However, the discussion of the components of FIG. 2B is incorporated by reference in their entirety.

Figure 3D:
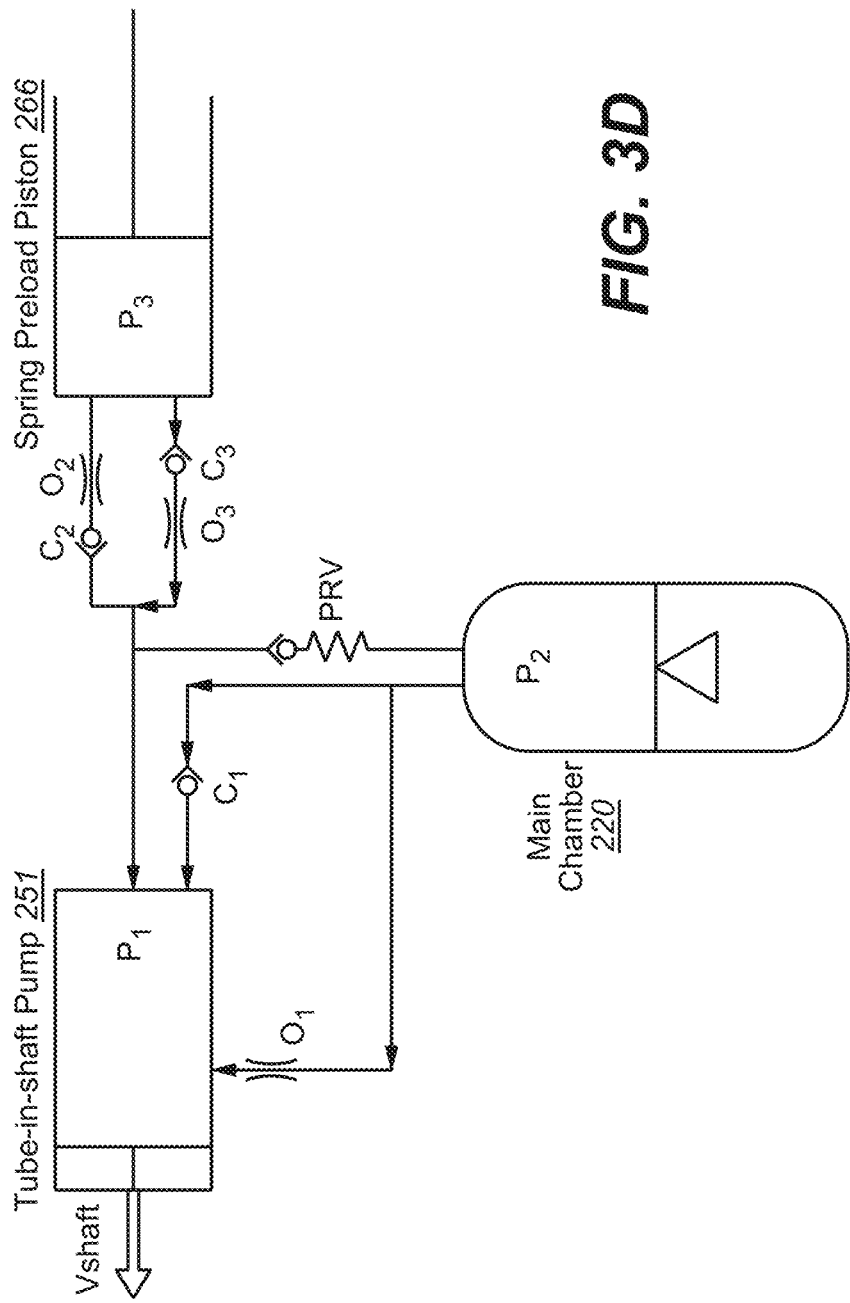
FIG. 3D is a schematic diagram of the shock assembly riding high in a rebound stroke, in accordance with an embodiment.

Referring now to FIG. 3D a schematic diagram of the shock assembly riding high in a rebound stroke with either low or high shaft speed is shown in accordance with an embodiment. In FIG. 3D, the fluid volumes are shown for the tube-in-shaft pump assembly 251 (e.g., P1), the main chamber 220 compression portion (e.g., P2), and the spring preload piston assembly 266 (e.g., P3).

In one embodiment of the shock assembly riding high in a rebound stroke (having either high or low shaft speed), the main chamber 220 compression portion P2 is low. The tube-in-shaft pump assembly 251 P1 will be less than or equal to the main chamber 220 compression portion P2. The tube-in-shaft pump assembly 251 P1 will be less than the spring preload piston assembly 266 P3. In one embodiment, the Vshaft can also be low or high.

Figure 3E:
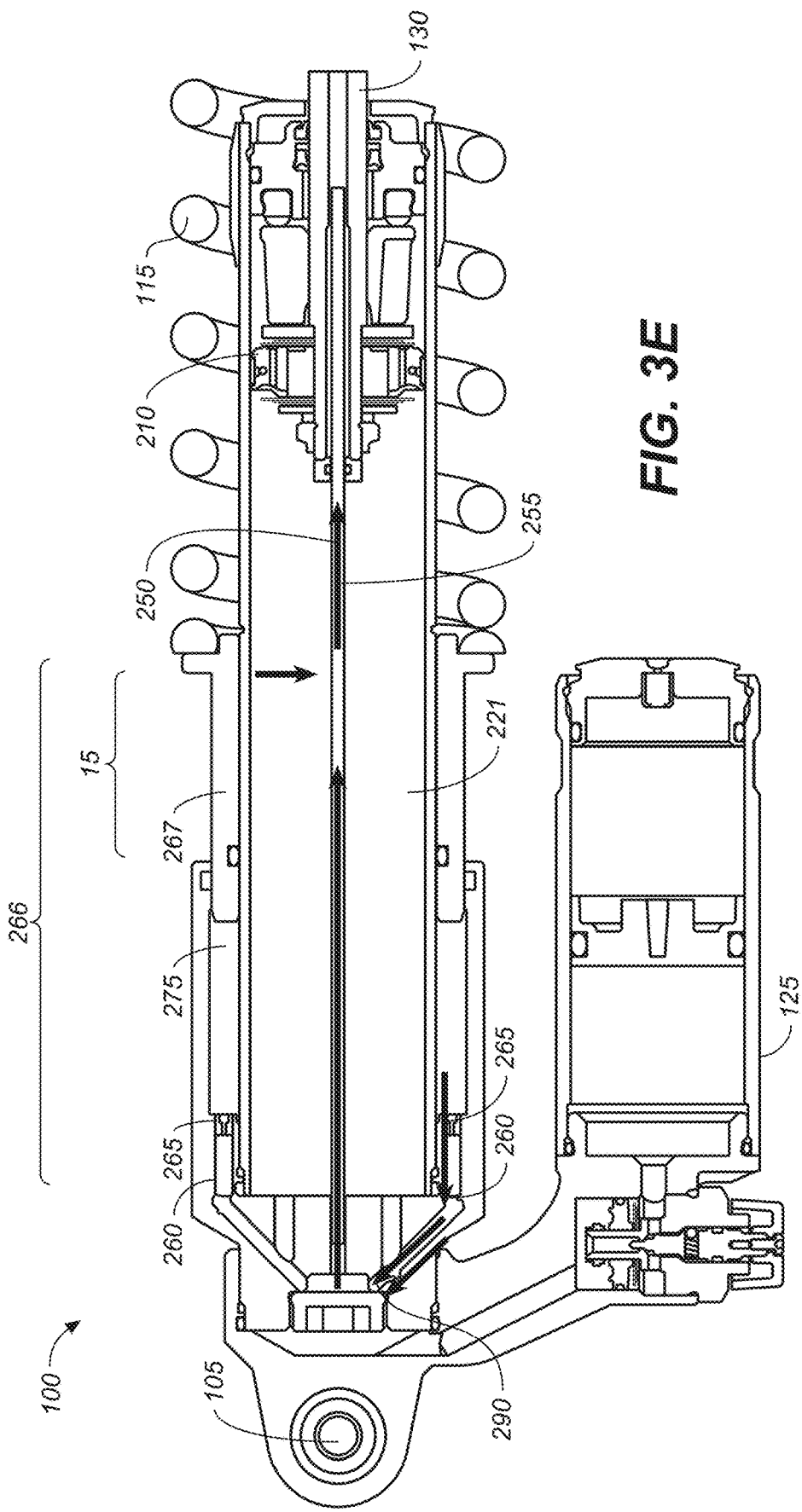
FIG. 3E is a section view of the shock assembly in a configuration illustrated in FIG. 3D, in accordance with an embodiment.

FIG. 3E is a section view of shock assembly 100 illustrating the operation of FIG. 3D, e.g., shock assembly 100 riding high in a rebound stroke (having either high or low shaft speed) shown in accordance with an embodiment. In one embodiment, the components of FIG. 3E are similar to those of FIG. 2B. Therefore, for purposes of clarity the component description will not be repeated, and instead, only the operational differences will be discussed. However, the discussion of the components of FIG. 2B is incorporated by reference in their entirety.

In one embodiment, in an example of a riding high scenario, the intake/exhaust port(s) 255 are not covered by the damping piston 210 and shaft 130. Therefore, during a compression stroke as shown in FIG. 3C, as long as the intake/exhaust port(s) 255 remained uncovered, the fluid being pumped through pump tube 250 would flow out of the intake/exhaust port(s) 255 and into the main chamber. Similarly, the fluid in fluid chamber 275 would be subjected to the pressure applied by the movement of spring retaining end 267 moving axially along the damping chamber into the fluid chamber as it is being driven by the spring pressure of spring 115. This pressure would cause fluid to drain from fluid chamber 275 into pump tube 250 and out of the intake/exhaust port(s) 255.

In one embodiment, the movement of spring retaining end 267 into fluid chamber 275 will decrease the exposed length 15 of spring retaining end 267, and therefore, the overall length of spring preload piston assembly 266. This reduction in the overall length of spring preload piston assembly 266 would reduce the overall length of shock assembly 100.

With reference now to FIG. 3E, since the shock is riding high, during the rebound stroke, the intake/exhaust port(s) 255 would remain uncovered and the pump tube 250 would continue to draw fluid from fluid chamber 275 as well as from main chamber 220. As such, the fluid chamber 275 would continue to contract in size as the fluid drained and the spring retaining end 267 would continue to be pushed into the fluid chamber 275 by the spring force of spring 115 reducing the length of spring preload piston assembly 266 as well as the length of shock assembly 100.

At the next compression (again shown in FIG. 3C), as long as the intake/exhaust port(s) 255 remain uncovered, fluid will continue to drain from the fluid chamber 275, which would further reduce the size of fluid chamber 275 and again cause the exposed length 15 of spring retaining end 267 to be reduced, thereby continuing to reduce the overall length of shock assembly 100. By reducing the length of shock assembly 100, the ride height would continue to be reduced.

In one embodiment, process of draining fluid from fluid chamber 275 would continue for each compression and rebound stroke until the ride height was lowered to a point such that at least a portion of the compression stroke caused the damping piston 210 and shaft 130 to begin to cover the intake/exhaust port(s) 255. Once the compression stroke began to cover the intake/exhaust port(s) 255, the draining of the fluid from fluid chamber 275 would continue at an incrementally slower pace until the shock assembly 100 returned to SAG, at which point the pumping and releasing of fluid into and out of fluid chamber 275 would again be back to an approximate equilibrium.

In one embodiment, the location of fluid chamber intake/exhaust port(s) 255 on the pump tube 250 are preset at the factory. In one embodiment, the location of fluid chamber intake/exhaust port(s) 255 is adjustable along the length of the shaft 130 to adjust a ride height. In one embodiment, the location of intake/exhaust port(s) 255 with respect to the pump tube 250 is changed by replacing the existing pump tube 250 with a different tube having the intake/exhaust port(s) 255 in a different location, thereby establishing a new SAG.

In one embodiment, the location of fluid chamber intake/exhaust port(s) 255 is adjustable along the length of the shaft 130 to adjust the SAG. For example, the rotation of pump tube 250 (and/or shaft 130, or another control surface) will adjust the location of fluid chamber intake/exhaust port(s) 255 within the main chamber 220. As discussed herein, in one embodiment, intake/exhaust port(s) 255 is shown in a centralized position for a desired SAG ride height such that the intake/exhaust port(s) 255 is similarly covered and uncovered by the damping piston 210 during the compression/rebound suspension cycle.

Thus, if the location of the intake/exhaust port(s) 255 is moved to a different location, which could be any along pump tube 250 within main chamber 220 (preset, user adjustable, automatically adjustable, or the like), the operating range (or amount of time that intake/exhaust port(s) 255 are not covered or behind damping piston 210) would be changed. In so doing, each different location of the intake/exhaust port(s) 255 would result in different ride height SAG settings.

In one embodiment, relief valve 290 is configured to provide a fluid dump or rapid release of fluid from fluid chamber 275. In one embodiment, the fluid relief valve 290 provides the fluid to the fluid reservoir when blow-off occurs.

Figure 3F:
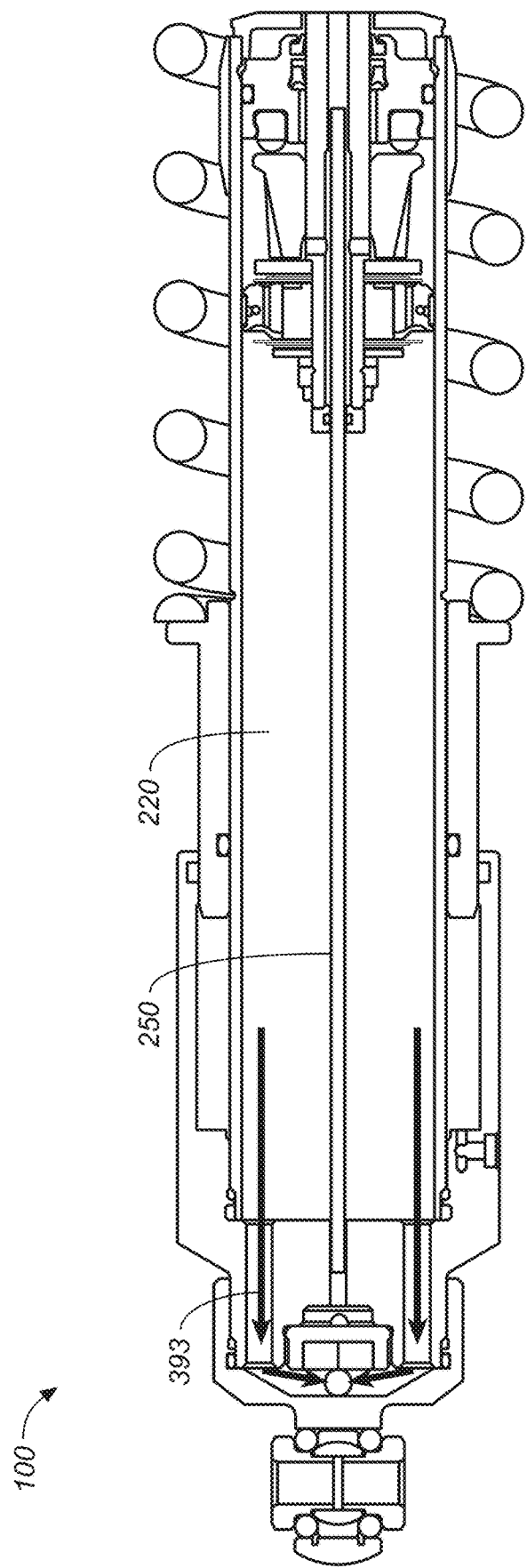
FIG. 3F is an alternate section view of the shock assembly with shaft flow to base valve/reservoir, in accordance with an embodiment.

Referring now to FIG. 3F, an alternate section view of the shock assembly 100 with shaft flow to base valve/reservoir is shown in accordance with an embodiment. In one embodiment, the shock assembly 100 of FIG. 3F shows the flow from the main chamber 220 through the base valve 393 and shows that the operation of the base valve 393 is not affected by the automatic ride height adjuster.

Tube-In-Shaft Pump Assembly with Spring and Valve Configuration 400

With reference now to FIGS. 4A-4F, embodiments of a shock assembly with an automatic ride height adjustment are described. In FIGS. 4A-4F, a number of the components and operation of the shock assembly were previously disclosed, or similar to those components previously disclosed, in the discussion of FIGS. 1-3F which are incorporated by reference. However, in FIGS. 4A-4F, a tube-in-shaft pump assembly 251 with a spring and valve configuration is used in place of the tube-in-shaft pump assembly 251 with at least one intake/exhaust port 255 opening in pump tube 250. In one embodiment, pump tube 250 is located the length of main chamber 220.

Thus, the following discussion of FIGS. 4A-4F, will focus on the operational differences when the shock assembly 100 uses the tube-in-shaft pump assembly 251 with a spring and valve configuration 400. For purposes of clarity, unless otherwise discussed, the remainder of the operation of the shock assembly 100 and will be similar to that already described in FIGS. 1-3F.

In other words, the modification of FIGS. 4A-4F is directly related to the change from an intake/exhaust port(s) 255 in pump tube 250 to a spring and valve configuration 400. Thus, the operation of spring preload piston assembly 266 remains the same.

Figure 4A:
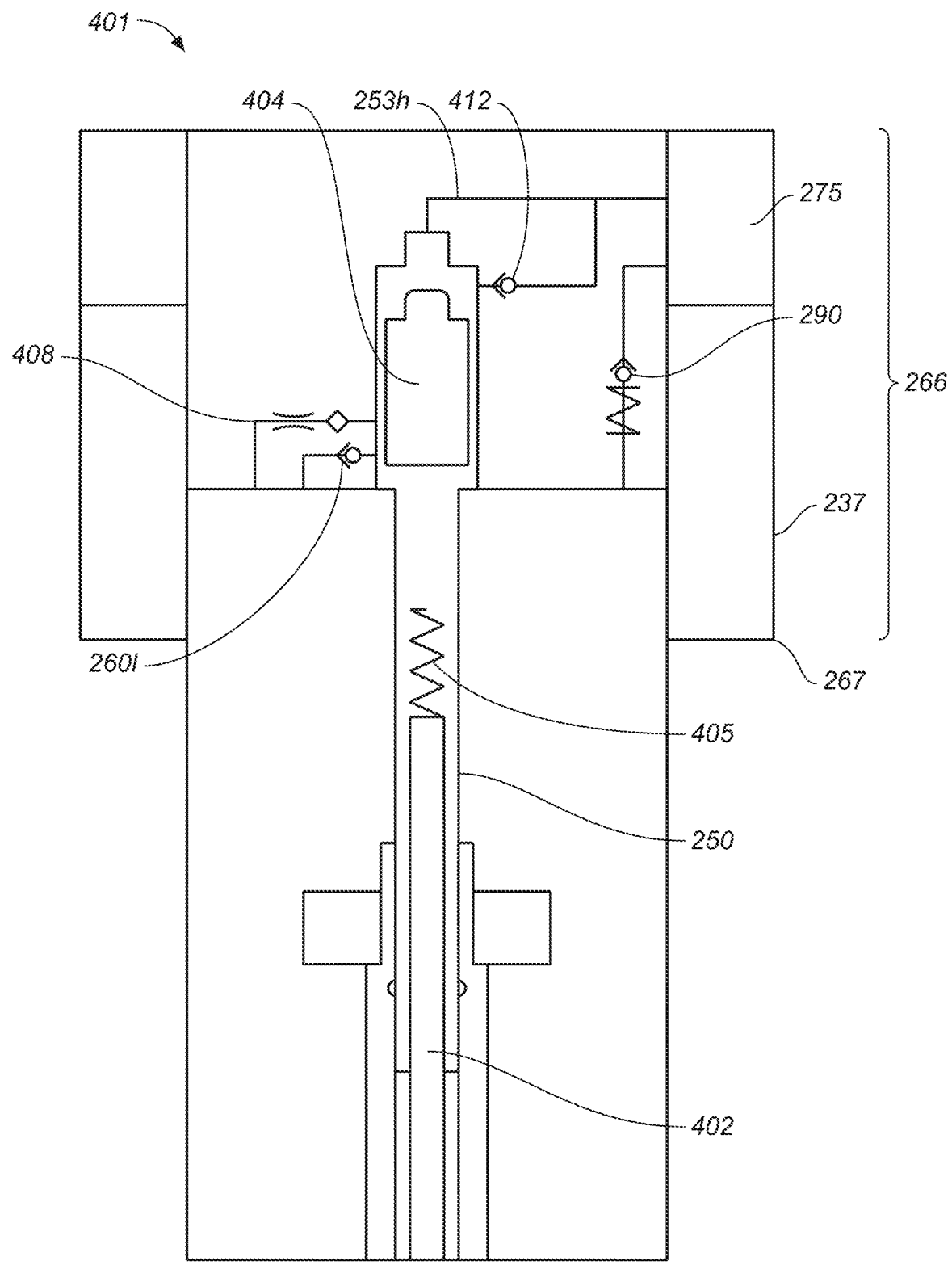
FIG. 4A is a schematic diagram of the shock assembly having an automatic ride height adjustment assembly with a tube-in-shaft pump assembly spring and valve configuration, in accordance with an embodiment.

With reference now to FIG. 4A, a schematic diagram 401 of a shock assembly with automatically adjustable ride height using a tube-in-shaft pump assembly 251 with the spring and valve configuration 400 to automatically adjustable ride height assembly in accordance with an embodiment. Schematic diagram 401 includes a spring preload piston assembly 266, pump tube 250, preload spring spacer 402, preload spring 405, valve 404, bleed orifice 408, low-pressure inlet check valve 260$l$, and fluid relief valve 290 (e.g., a high-pressure blow-off). Although a number of components are shown and described, in one embodiment, there may be more or fewer components. Thus, the use of the above components is an example of one embodiment.

In one embodiment, valve 404 is a poppet, a spool, or the like.

Figure 4B:
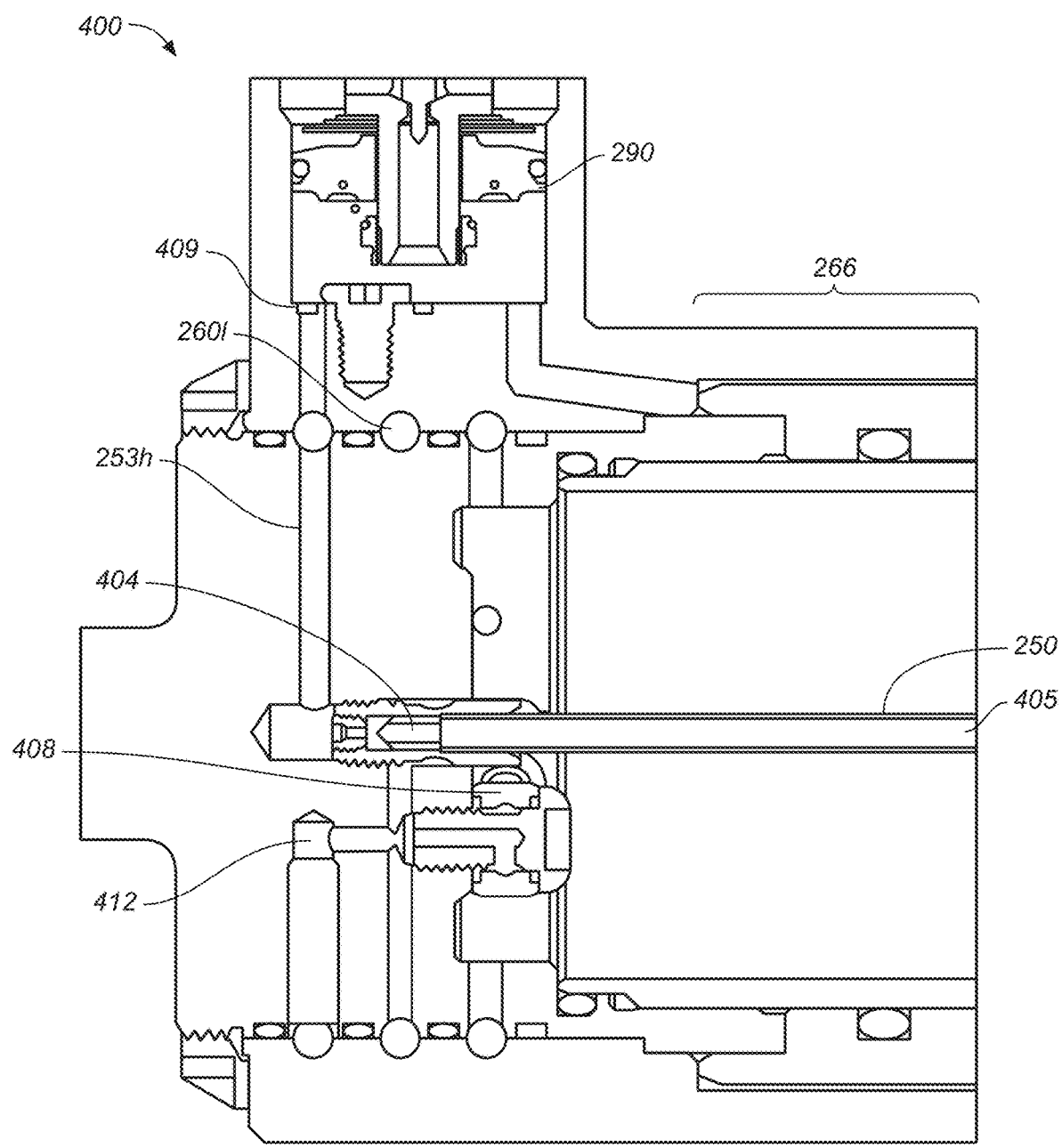
FIG. 4B is a section view of a portion of a shock assembly having an automatic ride height adjustment assembly with a tube-in-shaft pump assembly spring and valve configuration, in accordance with an embodiment.

Referring now to FIG. 4B, a section view of a portion of a shock assembly with an automatically adjustable ride height assembly using a tube-in-shaft pump assembly 251 with the spring and valve configuration 400 is shown in accordance with an embodiment. In one embodiment, tube-in-shaft pump assembly 251 with a spring and valve configuration 400 includes a number of the components described in FIGS. 1-3F.

In one embodiment, the tube-in-shaft pump assembly 251 with a spring and valve configuration 400 includes components such as spring preload piston assembly 266, pump tube 250, a preload spring spacer 402, a preload spring 405, a valve 404, a bleed orifice 408, filter 409, low-pressure inlet check valve 260$l$, high-pressure return path 253$h$. In one embodiment, the tube-in-shaft pump assembly 251 with a spring and valve configuration 400 is used to fill and/or empty the fluid chamber 275 of spring preload piston assembly 266.

In one embodiment, spring preload piston assembly 266 extends or contracts spring retaining end 267 to adjust the length of the spring preload piston assembly 266 thereby increasing or decreasing the length of shock assembly 100 to automatically adjust/return the ride height to SAG. In one embodiment, pump tube 250 forces fluid into the fluid chamber 275 when the shock is compressed and guides the preload spring 405 and preload spring spacer 402.

In one embodiment, preload spring spacer 402 is used to tune or adjust the point in the damping piston 210 stroke when the preload spring 405 engages the valve 404. In general, the preload spring 405 engages valve 404 when it provides enough force to close valve 404. Otherwise, if the preload spring 405 does not provide enough force to close valve 404, valve 404 will be disengaged.

In one embodiment, valve 404 controls the flow of fluid from the high-pressure return path 253$h$. When engaged by the preload spring 405, fluid is pumped through the high-pressure checked supply path 412 into the fluid chamber 275. However, when engaged, valve 404 will not allow fluid to leave the fluid chamber 275 via the high-pressure return path 253$h$.

When valve 404 is disengaged, fluid can still be pumped through the high-pressure checked supply path 412 into the fluid chamber 275. However, and in contrast to the engaged popped, when valve 404 is disengaged, the fluid in fluid chamber 275 is also allowed leave via the high-pressure return path 253$h$.

In one embodiment, the bleed orifice 408 includes filter 409 and is used to control the rate at which the fluid bleeds out of the fluid chamber 275, reducing preload, and lowering the vehicle. In one embodiment, the fluid of fluid chamber 275 can bleed through the bleed orifice 408 regardless of the position of valve 404 (e.g., engaged or disengaged).

In one embodiment, low-pressure inlet check valve 260$l$ allows fluid to flow into the pump tube 250. In one embodiment, the fluid flow from low-pressure inlet check valve 260$l$ goes to the main shock body. In one embodiment, low-pressure inlet check valve 260$l$ is provided after a base valve so the supply will always be low-pressure.

In one embodiment, fluid flow is shown between pump tube 250 and fluid chamber 275 of spring preload piston assembly 266. In one embodiment, low-pressure inlet check valve 260$l$ is a ball spring check valve. However, it should be appreciated that low-pressure inlet check valve 260$l$ could be another type of valve such as an intelligent quick switch (IQs) such as a stepper motor adjustable valve, an electronic valve, a gate valve, or the like.

In one embodiment, the low-pressure inlet 260$l$ either allows fluid flow in both directions (e.g., open) or only allows fluid to flow in one direction (e.g., closed). In so doing, even if the low-pressure inlet check valve 260$l$ is closed, when the shock assembly 100 is under significant load changes, the fluid flow is only closed in the direction of stopping fluid flow out of fluid chamber 275 of spring preload piston assembly 266. Thus, in one embodiment, even when the check valve 260 is closed, the fluid can be pumped into fluid chamber 275 of spring preload piston assembly 266.

In one embodiment, fluid relief valve 290 is a high-pressure blow-off. In one embodiment, as described herein, when the coil spring 115 is at full preload capacity (or a compression event that surpasses an event threshold occurs), there is a stop to prevent the spring preload cylinder from moving too far.

In one embodiment, fluid relief valve 290 is configured to provide a fluid dump or rapid release of fluid from fluid chamber 275, such as, for example, to prevent extreme pressures in system. In one embodiment, the fluid relief valve 290 provides the fluid released from fluid chamber 275 to the external fluid reservoir 125 when blow-off occurs.

In one embodiment, filter 409 is shown upstream of the bleed orifice 408 to filter large debris such as burrs from machining, poorly cleaned parts, assembly debris, etc. In one embodiment, the filter 409 is large enough to filter particles without restricting fluid flow. For example, in a bleed orifice 408 with an inner diameter of 0.0020 of an inch, in one embodiment, the filter 409 would be less than 0.0010 inch. As such, the filter 409 will stop larger particles that would plug the bleed orifice 408, but it will allow smaller contaminants to pass through. In so doing, the filter 409 will not become clogged with smaller particles.

Referring now to FIGS. 4C-4F, are section views of the shock assembly 100 riding in different configurations during compression and rebound are shown in accordance with an embodiment. In one embodiment, shock assembly 100 of FIGS. 4C-4F include the tube-in-shaft pump assembly 251 with a spring and valve configuration 400, the spring preload piston assembly 266, main chamber 220 within damper housing 120, damping piston 210 fixed to shaft 130, coil spring 115, and upper eyelet 105.

In one embodiment, the damping piston 210 and shaft 130 are axially movable toward or away from upper eyelet 105 within main chamber 220 axially along pump tube 250. In one embodiment, the movement of damping piston 210 and shaft 130 will also include the movement of preload spring spacer 402. For example, during compression, damping piston 210, shaft 130, and preload spring spacer 402 move axially through main chamber 220 toward upper eyelet 105. In contrast, during rebound, damping piston 210, shaft 130, and preload spring spacer 402 move axially through main chamber 220 away from upper eyelet 105. In one embodiment there is an external fluid reservoir 125.

In one embodiment, tube-in-shaft pump assembly 251 with a spring and valve configuration 400 uses the compression and rebound motion of damping piston 210, shaft 130, and preload spring spacer 402 to pump fluid from the main chamber 220 (or another fluid chamber such as a low-pressure reservoir fluid chamber) into fluid chamber 275 and/or bleed (or withdraw) fluid from fluid chamber 275 and back to the main chamber 220 (or another fluid chamber such as a low-pressure reservoir fluid chamber). In one embodiment, the fluid is pumped from the pump tube 250 into the fluid chamber 275 via the fluid flow path(s) 253 (such as high-pressure return path 253*h*) controlled by check valve(s) 260 (such as the check valve on low-pressure inlet check valve 260*l*), tunable orifice(s) 265, and the like.

In one embodiment, the pump tube 250 is filled with fluid and will pump the fluid into the fluid chamber 275 when the valve 404 is engaged e.g., when it is opened by the spring force of preload spring 405. In contrast, when the valve 404 is disengaged, such as during a rebound stroke, the fluid will be drawn from the fluid chamber 275 and back into pump tube 250 (unless the check valve is closed as described herein).

In one embodiment, the SAG for shock assembly 100 is set by adjusting the location of the preload spring spacer 402 to tune the point in the damping piston 210 stroke when the preload spring 405 engages the valve 404. Thus, adjusting the preload spring spacer 402 will establish the SAG, in the same way that adjusting the location of intake/exhaust port(s) 255 opening set the SAG.

In one embodiment, the location of the preload spring spacer 402 along the pump tube 250 and in relation to the preload spring 405 and the spring force it exerts on valve 404 are preset at the factory. In one embodiment, the location of preload spring spacer 402 is adjustable along the length of the pump tube 250 within shaft 130 to adjust a ride height by a user or a tuner at a store, a bike shop, at home, etc. In one embodiment, the location of preload spring spacer 402 with regard to the preload spring 405 and the spring force it exerts on valve 404 is changed by replacing the existing preload spring spacer 402 with another preload spring spacer 402 of a different length, thereby establishing a new SAG.

In one embodiment, the location of preload spring spacer 402 is user adjustable along the length of the shaft 130 to adjust the SAG. For example, the rotation of pump tube 250 (and/or shaft 130, or another control surface) will adjust the location of preload spring spacer 402 within pump tube 250 which will modify the relationship with the preload spring 405 and the spring force it exerts on valve 404.

In one embodiment, once the desired SAG ride height is established. The preload spring spacer 402 will be located such that when in SAG, the preload spring 405 will exert an amount of spring force on valve 404 that will not be engaged. However, as the damping piston 210 and shaft 130 move during the compression and rebound suspension cycles that spring force will change.

In general, while the vehicle is in SAG ride height, on a compression stroke the preload spring spacer 402 will push against the preload spring 405 such that the additional amount of spring force applied to valve 404 will engage valve 404. When valve 404 is engaged, fluid will be added to fluid chamber 275.

In contrast, while the vehicle is in SAG ride height, on a rebound stroke the preload spring spacer 402 will release an amount of pressure applied to the preload spring 405 such that the reduced amount of spring force from preload spring 405 will disengage valve 404. When valve 404 is disengaged, fluid will be bled from fluid chamber 275.

Thus, when the vehicle is in SAG ride height, the tube-in-shaft pump assembly 251 with a spring and valve configuration 400 will maintain the SAG ride height by pumping fluid into and releasing fluid from fluid chamber 275.

In one embodiment, if a change in the SAG ride height was desired, the location of preload spring spacer 402 would be adjusted (e.g., user adjusted, manually adjusted, automatically adjusted, or the like), which would change the SAG ride height location of damping piston 210 within main chamber 220 and similarly adjust the force applied to preload spring 405 and thus, the spring force it exerts on valve 404. In so doing, an adjustment in the preload spring spacer 402 would result in a different ride height SAG setting.

In one embodiment, preload spring 405 could be replaced with a preload spring 405 having a different length to modify the desired SAG ride height. In one embodiment, preload spring 405 could be replaced with a preload spring 405 having a different spring constant to modify the desired SAG ride height. In one embodiment, preload spring 405 could be replaced with a preload spring 405 having a different length and a different spring constant to modify the desired SAG ride height.

In one embodiment, one, some, or all of the location of preload spring spacer 402, the length of preload spring spacer 402, the length of preload spring 405, and/or the spring constant of preload spring 405 could be adjusted to change the SAG ride height.

In one embodiment, the pump tube 250 of the tube-in-shaft pump assembly 251 may include an interior tube that utilizes the spring and valve configuration 400, and an exterior tube (e.g., a larger pump tube surrounding a smaller pump tube) that has the intake/exhaust port(s) 255 opening such that the tube-in-shaft pump assembly 251 would utilize both pumping schemes described herein to achieve and maintain the vehicles SAG ride height.

For example, if the suspension of the vehicle had a large range of motion or if the shock assembly 100 were for a heavy-duty vehicle (e.g., a semi-truck, heavy towing vehicle, mining truck, etc.) and therefore larger in girth and/or overall length than a shock assembly 100 for a normal vehicle (e.g., a side-by-side, motorcycle, pick-up truck, etc.), the amount of fluid that could be pushed into fluid chamber 275 would be large enough that the operation of both of the disclosed tube-in-shaft pump assembly 251 configurations would provide a more efficient capability to maintain the SAG ride height as the vehicle is loaded and/or unloaded.

Riding Low

Figure 4C:
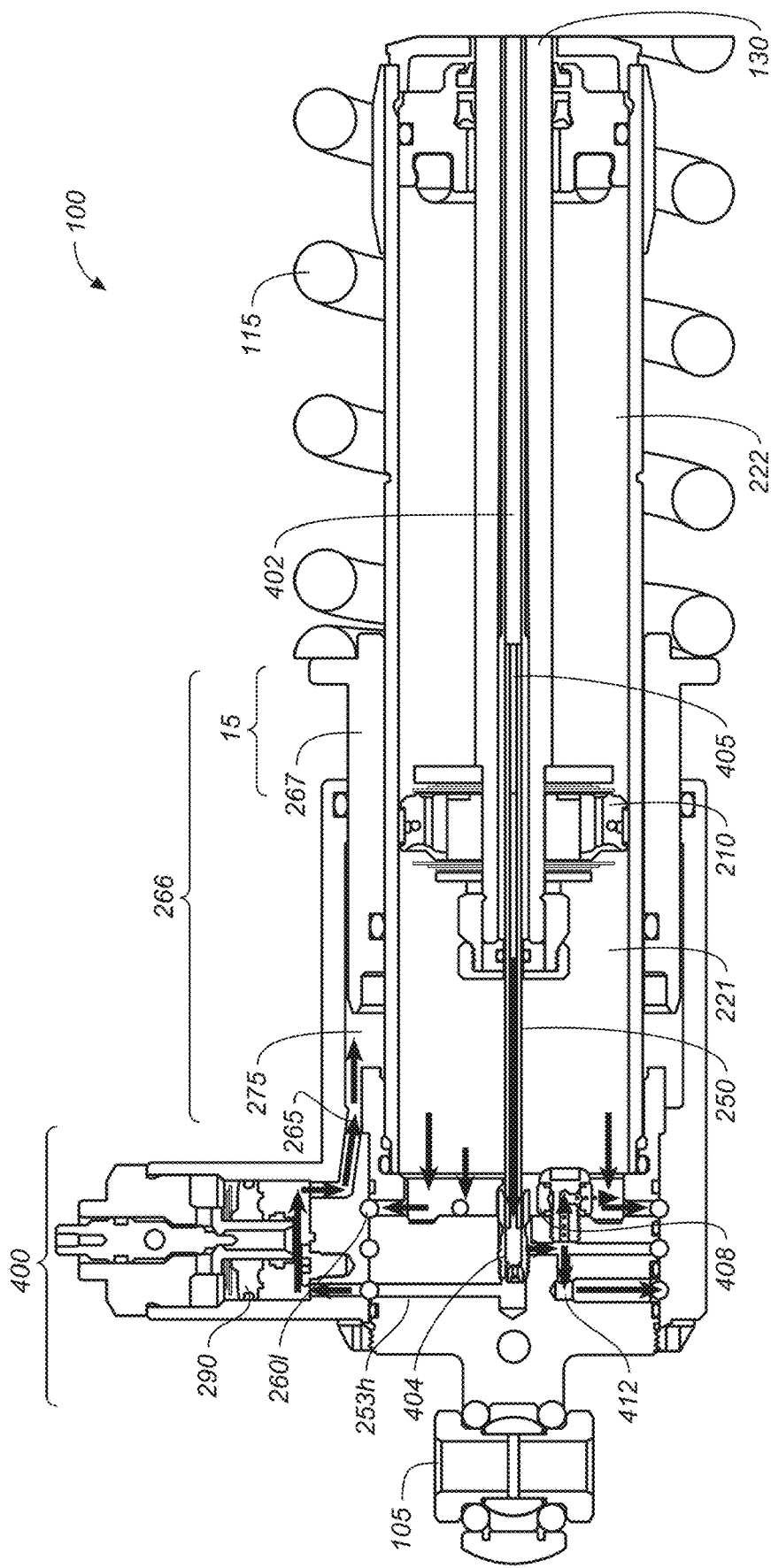
FIG. 4C is a section view of the shock assembly having the tube-in-shaft pump assembly spring and valve configuration riding low in a compression stroke, shown in accordance with an embodiment.
Figure 4D:
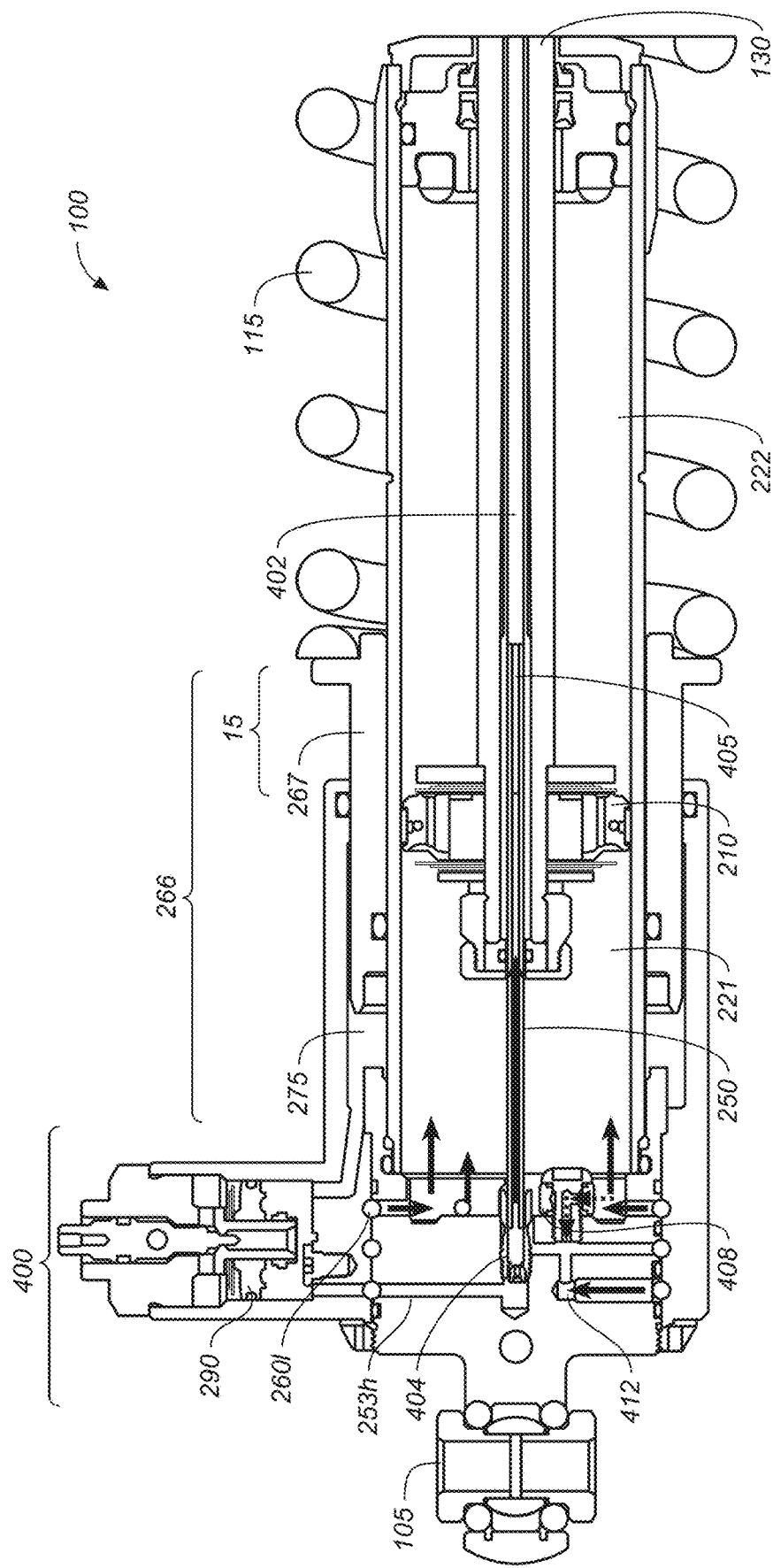
FIG. 4D is a section view of the shock assembly having the tube-in-shaft pump assembly spring and valve configuration riding low in a rebound stroke, shown in accordance with an embodiment.

As stated herein, FIG. 4C is a section view of the shock assembly 100 having the tube-in-shaft pump assembly 251 with a spring and valve configuration 400 riding low in a compression stroke in accordance with an embodiment. In contrast, FIG. 4D is a section view of the shock assembly 100 having the tube-in-shaft pump assembly 251 with a spring and valve configuration 400 riding low in a rebound stroke in accordance with an embodiment.

As described herein, riding low refers to a suspension ride height that is lower than the SAG. In one example, the vehicle may be riding low when weight is added to the vehicle, the shock assembly 100 length is shortened at least at the location where the weight is added. This reduction in shock assembly 100 length will result in a vehicle ride height that is lower than its SAG configuration.

In one embodiment of the low riding compression stroke, the fluid volumes and pressures are similar to those described in FIGS. 2C and 2E. In one embodiment, the shortening of the shock assembly 100 length, causes damping piston 210, shaft 130, and preload spring spacer 402 to move up the pump tube 250 closer to the upper eyelet 105. As such, in a static situation, the valve 404 will be engaged by preload spring 405.

In one embodiment, during a compression stroke as shown in FIG. 4C, when the valve 404 is engaged the fluid is pumped up the pump tube 250 and into the fluid chamber 275 via the high-pressure checked supply path 412. In other words, pump tube 250 can pump fluid through the high-pressure checked supply path 412 even when preload spring 405 is engaging valve 404. In one embodiment, a majority of the fluid flows through the flow paths indicated by the light flow arrows of FIG. 4C. In one embodiment, a small amount of pump flow is lost across the open bleed orifice 408 as shown by the dotted arrow. However, as long as valve 404 is engaged, high-pressure return path 253*h* will be closed and fluid will not be able to leave fluid chamber 275 via the closed high-pressure return path 253*h*.

In one embodiment, the additional fluid pumped into fluid chamber 275 will cause fluid chamber 275 to expand causing spring retaining end 267 to move axially along the damping chamber increasing the exposed length 15 of spring retaining end 267. This will increase the overall length of spring preload piston assembly 266 which will increase the overall length of shock assembly 100 and cause the ride height to begin to rise.

With reference now to FIG. 4D, since the shock is riding low, during some or all of the rebound stroke, the valve 404 will remain engaged for a majority of even all of the rebound stroke. In one embodiment, while the valve 404 is engaged, high-pressure return path 253*h* will be closed and fluid will not be able to leave fluid chamber 275 via the closed high-pressure return path 253*h*. In one embodiment, the fluid that refills the pump tube will flow through the low-pressure inlet check valve 260*l* (as shown by the light arrow).

At the next compression (again shown in FIG. 4C), the fluid that was added to the pump tube 250 during rebound would be pumped into fluid chamber 275 via the high-pressure checked supply path 412, which would again expand the size of fluid chamber 275 and again cause the spring retaining end 267 to be hydraulically pushed axial outward increasing the overall length of shock assembly 100 and the ride height.

In one embodiment, the fluid chamber 275 filling process will continue for each compression and rebound stroke until the ride height begins to approach SAG, at which time, a portion of the rebound stroke (shown in FIG. 4D) causes the preload spring 405 pressure on valve 404 to drop below the pressure on valve 404 from the fluid in high-pressure return path 253*h*. When that transition does occur, valve 404 will disengage. When valve 404 is disengaged, an amount of fluid would be released from fluid chamber 275 through the high-pressure return path 253*h*. After that point, such as during the next compression stroke, the valve 404 would be engaged and then during part of the rebound stroke the valve 404 would be disengaged.

However, the valve 404 would likely spend a larger amount of time engaged than disengaged which would mean the pumping of more fluid into fluid chamber 275 than the removal of fluid from fluid chamber 275 would continue, although at a slower pace, until the shock assembly 100 returned to SAG, at which point the pumping and releasing of fluid from fluid chamber 275 would again be back to an approximate equilibrium.

In one embodiment, once the SAG height is reached, if the vehicle is stopped or parked, the preload spring 405 force on valve 404 would keep valve 404 engaged keeping the high-pressure return path 253*h* closed. As such, the ride height will not "sink" over time even if the vehicle is stopped at a red light, or parked for an amount of time.

In one embodiment, once the SAG height is reached, if the vehicle is stopped or parked, in a semi-active embodiment, the check valve 260 (and or fluid relief valve 290) can also be closed such that the fluid will not leak out of fluid chamber 275, and therefore the ride height will not "sink" over time even if the vehicle is stopped at a red light, or parked for an amount of time.

In one embodiment, if the load was too heavy, the maximum size of fluid chamber 275 could be reached without the shock assembly 100 reaching SAG height. This could be due to the load causing a significant compression to coil spring 115 and thus the shortening of the axial length 16. In this example, once the maximum size (or capacity) of fluid chamber 275 was reached, more fluid would still be being pumped from pump tube 250 through the high-pressure checked supply path 412 toward fluid chamber 275. However, since the size of fluid chamber 275 is maximized, in one embodiment, any additional fluid that is pumped from pump tube 250 through the high-pressure checked supply path 412 toward the fluid chamber 275 would be released through the fluid relief valve 290.

In one embodiment, if the shock assembly 100 were to encounter a significant event causing a large compression, some amount of the fluid pumped from pump tube 250 through the high-pressure checked supply path 412 would also be dumped through the fluid relief valve 290.

Riding High

Figure 4F:
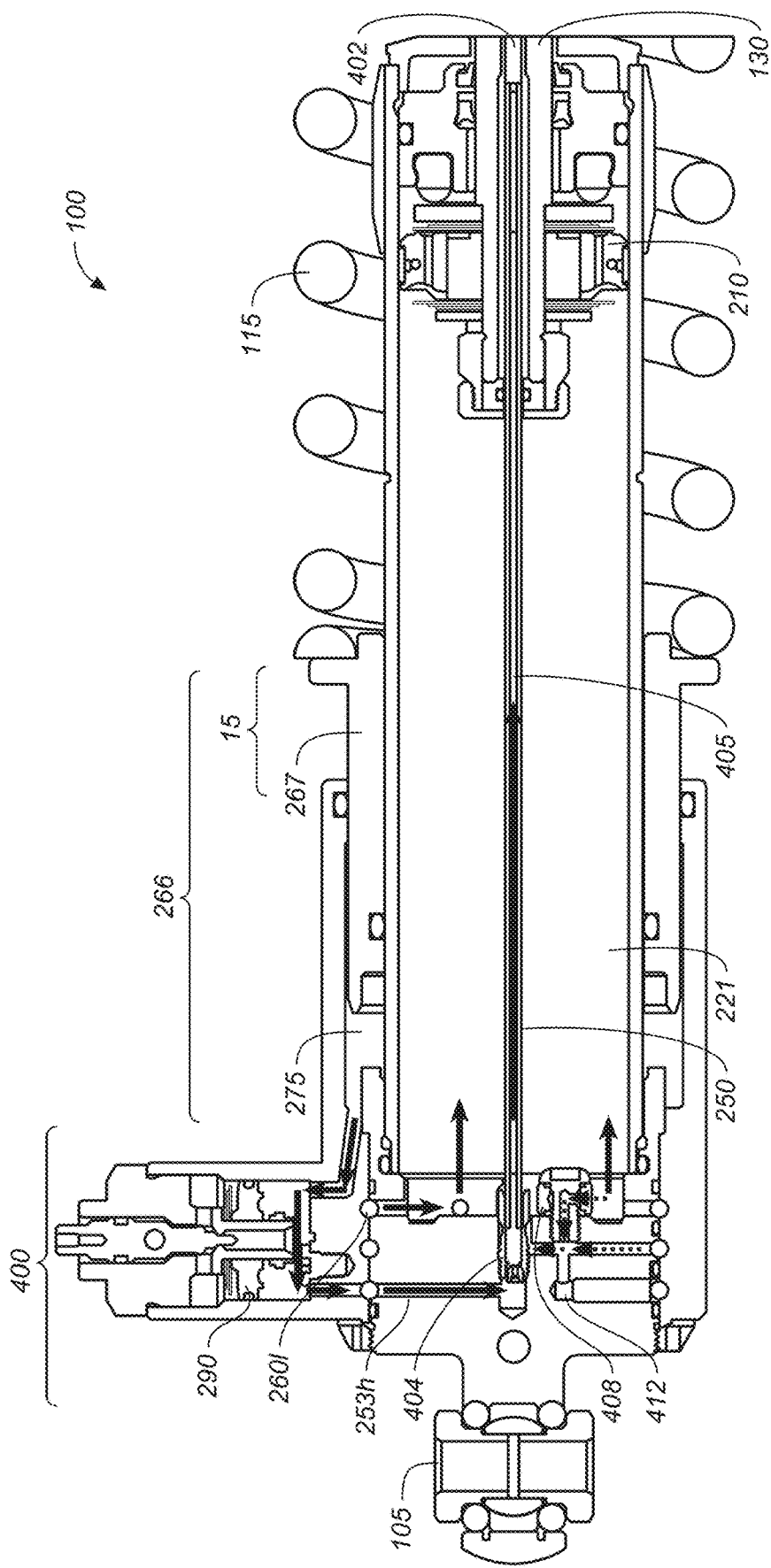
FIG. 4F is a section view of the shock assembly having the tube-in-shaft pump assembly spring and valve configuration riding high in a rebound stroke, shown in accordance with an embodiment.

As stated herein, FIG. 4E is a section view of the shock assembly 100 having the tube-in-shaft pump assembly 251 with a spring and valve configuration 400 riding high in a compression stroke in accordance with an embodiment. In contrast, FIG. 4F is a section view of the shock assembly 100 having the tube-in-shaft pump assembly 251 with a spring and valve configuration 400 riding high in a rebound stroke in accordance with an embodiment.

In one embodiment, when weight is removed from the vehicle, the shock assembly 100 length is increased at least at the location where the weight was removed. In one embodiment, the increase of the shock assembly 100 length, causes damping piston 210, shaft 130, and preload spring spacer 402 to move down the pump tube 250 away from the upper eyelet 105. This increase in shock assembly 100 length will result in a vehicle ride height that is higher than its SAG configuration.

In one embodiment of the riding high compression stroke, the fluid volumes and pressures are similar to those described in FIGS. 3A and 3B. In one embodiment of the riding high rebound stroke, the fluid volumes and pressures are similar to those described in FIG. 3D.

In one embodiment, in an example of a riding high scenario, the valve 404 is disengaged due to the lack of spring force on valve 404 from preload spring 405. Since the valve 404 is disengaged, the fluid in fluid chamber 275 is able to flow out of the fluid chamber 275 through the open high-pressure return path 253h. This will allow the spring retaining end 267 to begin to retract into fluid chamber 275 which will decrease the exposed length 15 of spring retaining end 267, and therefore reduce the overall length of spring preload piston assembly 266. Reducing the overall length of spring preload piston assembly 266 will reduce the overall length of shock assembly 100 and cause the vehicle ride height to lower.

During a compression stroke as shown in FIG. 4E, the fluid being pumped through pump tube 250 would flow into the high-pressure checked supply path 412. However, as long as valve 404 remains disengaged, the fluid in fluid chamber 275 will continue to flow out of fluid chamber 275 through the open high-pressure return path 253h. In one embodiment, some small amount of pump flow would also be lost across the open bleed orifice 408.

In one embodiment, fluid will leave fluid chamber 275 as it will be subjected to the pressure applied by the movement of spring retaining end 267 moving axially along the damping chamber into the fluid chamber as it is being driven by the spring pressure of coil spring 115. This pressure would cause fluid to drain from fluid chamber 275.

In one embodiment, the movement of spring retaining end 267 into fluid chamber 275 will decrease the exposed length 15 of spring retaining end 267, and therefore, reduce the overall length of spring preload piston assembly 266 and the overall length of shock assembly 100.

With reference now to FIG. 4F, since the shock assembly 100 is riding high, during the rebound stroke, valve 404 would remain disengaged and the fluid that was pumped into high-pressure checked supply path 412 during the compression stroke will not be restricted by valve 404 and will return to refill the pump tube 250. At the same time, fluid would continue to drain from fluid chamber 275 via high-pressure return path 253h. Therefore, in one embodiment, during rebound the fluid chamber 275 would continue to contract in size as the fluid drained from fluid chamber 275 and the spring retaining end 267 would continue to be pushed into the fluid chamber 275 by the spring force of coil spring 115 reducing the length of spring preload piston assembly 266 as well as the length of shock assembly 100.

At the next compression (again shown in FIG. 4E), as long as valve 404 remains disengaged, fluid will continue to be pumped into high-pressure checked supply path 412 and drain from the fluid chamber 275 via high-pressure return path 253h. At the next rebound, the fluid in high-pressure checked supply path 412 would return to refill the pump tube 250, and additional fluid would continue to leave fluid chamber 275 via high-pressure return path 253h which would further reduce the size of fluid chamber 275 and again cause the exposed length 15 of spring retaining end 267 to be reduced, thereby continuing to reduce the ride height.

In one embodiment, the draining of fluid from fluid chamber 275 would continue for each compression and rebound stroke until the ride height was lowered to a point approaching SAG such that at least a portion of the compression stroke caused the preload spring spacer 402 to begin to engage valve 404. Once the compression stroke began to engage valve 404, the draining of the fluid from fluid chamber 275 via high-pressure return path 253h would stop when the valve 404 was engaged, but begin again when valve 404 was disengaged (such as during a portion of the rebound stroke). As such, the reduction of fluid from fluid chamber 275 would continue at an incrementally slower pace until the shock assembly 100 returned to SAG, at which point the pumping and releasing of fluid into and out of fluid chamber 275 would again be back to an approximate equilibrium.

In one embodiment, fluid relief valve 290 is configured to provide a fluid dump or rapid release of fluid from fluid chamber 275. In one embodiment, the fluid relief valve 290 provides the fluid to the fluid reservoir when blow-off occurs.

Figure 4G:
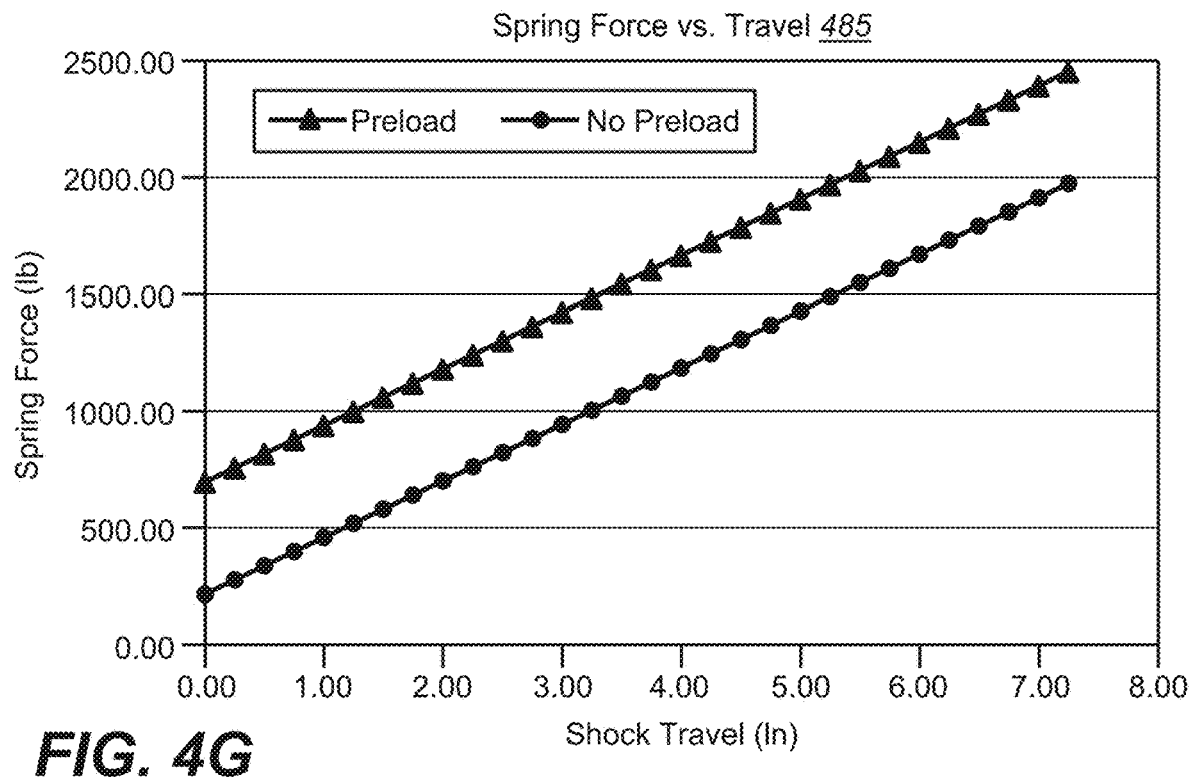
FIG. 4G is a graph of spring force versus travel for a shock assembly with and without an automatic ride height adjustment due to an additional load, shown in accordance with an embodiment.

With reference now to FIG. 4G, a graph of spring force versus travel 485 for a shock assembly with and without an automatic ride height adjustment due to an additional load, shown in accordance with an embodiment.

In one embodiment, the graph of spring force versus travel 485 shows an example of the increased spring preload force vs shock travel for both preload cases. In one embodiment, as shown in the graph of spring force versus travel 485, the spring preload system can add an additional 500 lb of force per shock for added payload. In one embodiment, as shown in the graph of spring force versus travel 485 the automatic ride height adjustment system has 2" of preload capability, and vehicle uses a 250 lb/in spring.

Figure 4H:
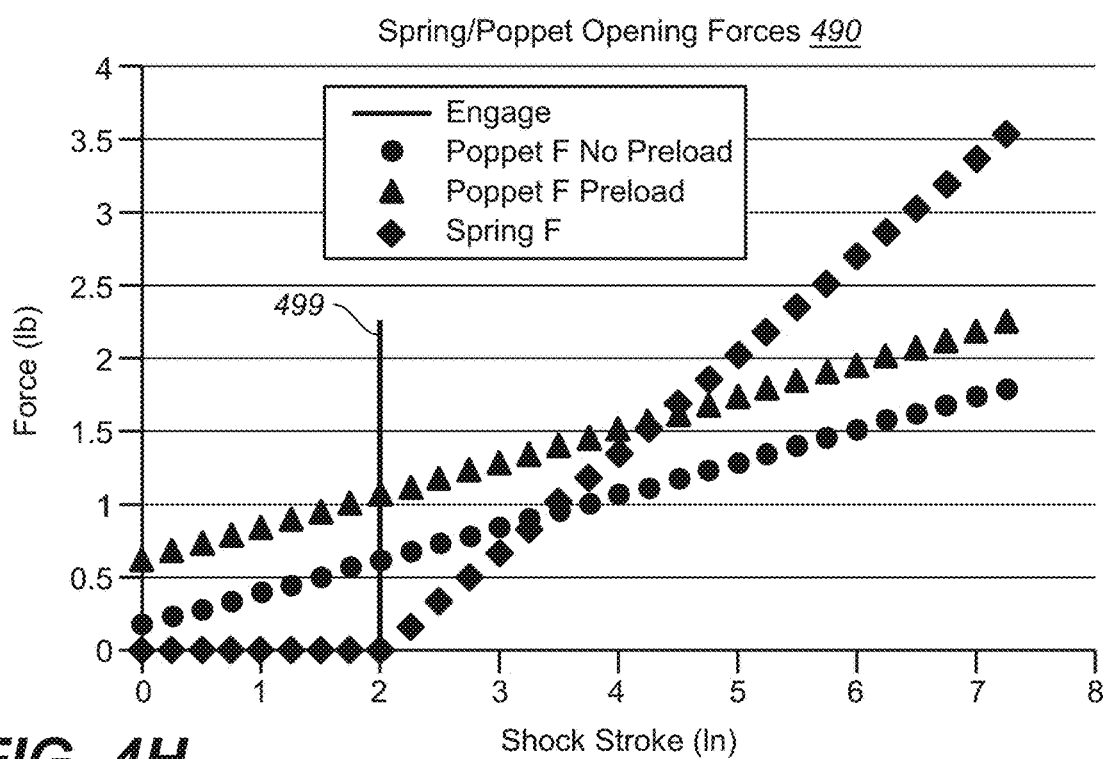
FIG. 4H is a graph of spring/valve opening forces for the shock assembly with and without an automatic ride height adjustment due to an additional load, shown in accordance with an embodiment.

FIG. 4H is a graph of spring/valve opening forces 490 for the shock assembly with and without an automatic ride height adjustment due to an additional load, shown in accordance with an embodiment.

In one embodiment, the graph of spring/valve opening forces 490 is an example showing the forces required to close the valve tuned for an engagement shock stroke of 2" as indicated by the vertical engaged line at the 2" mark on the graph of spring/valve opening forces 490. The line plotted in diamonds shows the spring force acting on the valve. In one embodiment, this must exceed the force acting on the valve by the hydraulic preload chamber pressure in order to pump the system up to add preload; e.g., (Force=Chamber Pressure*Valve Seat Area).

The line plotted in circles shows the force acting on the valve when there is no preload on the spring. The line plotted in triangles shows the force acting on the valve when the system is at full preload.

Mark 499 indicates when the preload spring 405 would begin to be engaged. At about 3.5 inches of shock stroke, if there is no spring preload on the system, it will start to pump-up the spring preload piston assembly 266. In contrast, if there is full-preload on the system, it will attempt to start pumping up the spring preload piston assembly 266 at about 4 inches of shock stroke.

In one embodiment, the speed of the pump-up is a tuning parameter that can be set during the OE tuning cycle. In one embodiment, depending upon the speed of pump-up desired by the customer, parameters such as valve preload, valve seat diameter, the pump tube diameter, and the like, can be tuned, adjusted, modified, or replaced to obtain the desired pump-up speed.

For example, in one embodiment, any, some, or all of the orifice sizes in the flow path for the automatic ride height adjustment assembly (including the fluid relief valve 290, intake/exhaust port(s) 255, valve 455, and the like) are manually adjustable. For example, the orifice size(s) could be adjusted by a party accessing an exterior adjustment feature to manually adjust the one or more orifice sizes.

In one embodiment, any, some, or all of the orifice sizes and/or the flow paths for the automatic ride height adjustment assembly (including the fluid relief valve 290, intake/exhaust port(s) 255, valve 455, and the like) are automatically adjustable such as via the use of an active valve 550.

For example, little orifices/flow channels are good for small velocity inputs into the shock assembly such as in a passenger car driving down a paved road. However, when the inputs are higher velocity inputs (like those suspension events that occur in an offroad environment and/or offroad vehicle), the size of the orifices need to be larger to reduce the increased damping that would otherwise occur in the little orifices. Thus, the ability to adjust the orifice size allows the adjustment to be made depending upon the environment.

Moreover, by using adjustable orifice sizes, check valves, and the like, the ride height will not "sink" over time even if the vehicle is parked. That is, the fluid in the fluid chamber will be held in the chamber without bleed.

In one embodiment, the automatic ride height adjustment assembly can include one of, a combination of, or all of the different available adjustment options. That is, check valve 260 open or closing, moving the location of the intake/exhaust port(s) 255, the fluid chamber 275 including a check valve 260, the blow-off setting of relief valve 290, the size of tunable orifice 265 is adjustable, etc. In so doing, the adjustments to the operational characteristics of the automatic ride height adjustment assembly can be almost infinite. Further, the ability to automate the movement and/or opening of the different components and valves can provide significant adjustment capability that can be provided at different times within a single span of a ride. Moreover, if an extreme event is realized, the excess pressure in fluid chamber 275 could be automatically reduced using check valve 260 and/or relief valve 290.

Thus, embodiments provide the ability to self-level a vehicle. That is, to automatically return to and maintain the ride height (e.g., the SAG for the vehicle). For example, if weight is added to the cargo bed the ride height of vehicle will drop. To counteract this the passive ride height system will begin pumping fluid to a hydraulic spring preload system when the shock is cycled until SAG ride height is achieved. Thus, embodiments provide the ability to automatically return to and maintain the SAG ride height of a vehicle.

In general, pump tube 250 provides a fluid flow path between a rebound portion of the damper and fluid chamber 275. In one embodiment, the pump tube 250 is located within shaft 130, that is, it is internal to the shaft 130. In another embodiment, pump tube 250 is partially (or completely) external of the shaft 130.

In one embodiment, valve 404 is a check valve. However, it should be appreciated that valve 404 could be another type of valve such as an intelligent quick switch (IQs), a stepper motor adjustable valve, an electronic valve, a gate valve, or the like.

In one embodiment, the preload spring spacer 402 in the pump tube 250 is located with respect to the preload spring 405 such that the pressure on preload spring 405 will keep valve 404 closed at the proper ride height or SAG.

In one embodiment, a vehicle will have SAG settings resulting in a pre-established ride height. In a static situation, the ride height of the vehicle is at or about the SAG. When in motion, the ride height will change as the vehicle travels over the surface, and while the suspension system is used to reduce the transference of any input forces received from the surface to the rest of the vehicle, another goal of the suspension system is to return the vehicle to its SAG.

In another example, a rider is utilizing a snowmobile and has the suspension ride height set up for a single rider (e.g., 140 lbs.). At some point, the rider invites a passenger along to also enjoy the sled ride. However, with two riders on the sled, the weight is now (200 lbs.) and the suspension ride height (e.g., the established SAG for the vehicle) is lowered due to the compression of shock assembly 100.

In one embodiment, by utilizing the automatic ride height adjustment assembly, the system would adjust the fluid volume in fluid chamber 275 as described herein to increase the overall length of the shock assembly and return the snowmobile to the established SAG for the vehicle. Thus, this would return the suspension ride height to a relatively similar SAG as it was set for the solo rider with little or no changes to any damper settings, preload, or the like.

In one embodiment, when the passenger gets off of the sled, the ride height adjustment assembly would again adjust the fluid volume in fluid chamber 275 (as described herein), thereby returning the ride height to the established SAG. This time, for example, the amount of fluid in fluid chamber 275 would be reduced so that the overall length of shock assembly 100 would be reduced until it reached the appropriate length for the SAG. Thus, here again the suspension ride height would be returned to an initial SAG, and again with little or no changes to any damper settings, preload adjustments, or the like.

In another example, if the additional weight added to the vehicle resulted in a 10 mm reduction in height from the established SAG, during suspension operation as described above, the axial length of spring preload piston assembly 266 would be automatically increased until the ride height was returned to the established SAG. As such, the return to SAG would be automatic and would make little or no changes to any damper settings, preload, or the like of shock assembly 100.

Moreover, when the additional weight was removed, the ride height would become higher than the established SAG, during suspension operation as described above, the axial length of spring preload piston assembly 266 would be reduced until the SAG was achieved. As such, the ride height would be automatically return to the proper SAG with little or no changes to any damper settings, preload, or the like of shock assembly 100.

Therefore, if a vehicle is loaded with an additional 500 lbs. of cargo in the rear, the extra 500-pound load will cause shock assembly compression (and the like) thereby causing the vehicle to ride lower in the rear. In general, this lower rear ride height, or compressing of the rear suspension, will move the vehicle out of SAG and change the vehicle geometry, e.g., cause a slant upward from rear to front. While the vehicle sensors described herein can identify the out of SAG situation, often, these changes can also be visually identified by a reduction in space between the wheel and the wheel well of the rear wheel as compared to space between the front wheels and wheel wells on the vehicle, or by the angle of the vehicle.

In one embodiment, the additional load will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, when the weight is added to the vehicle, if it is not centered, it will not only cause a change in the front or rear SAG (depending upon the load location fore or aft), but will also cause SAG changes that will differ between the left and right side of the vehicle (again depending upon the load location and this time whether the load is heavier on the right or left side of the vehicle centerline).

For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of issues including, but not limited to: steering problems, suspension bottom out, loss of control, tire blowout, and vehicle rollover.

However, by utilizing the automatic ride height adjustment shock assembly disclosed herein, the suspension system would adjust the fluid volume in the fluid chambers of each shock assembly in the suspension system to return the vehicle to the established SAG. As such, the lopsided suspension characteristics would be resolved, and the vehicle would be in a significantly safer suspension configuration that does not have (or has to a much lesser degree) any number of the above issues including, but not limited to: steering problems, suspension bottom out, loss of control, tire blowout, and vehicle rollover.

Figure 5A:
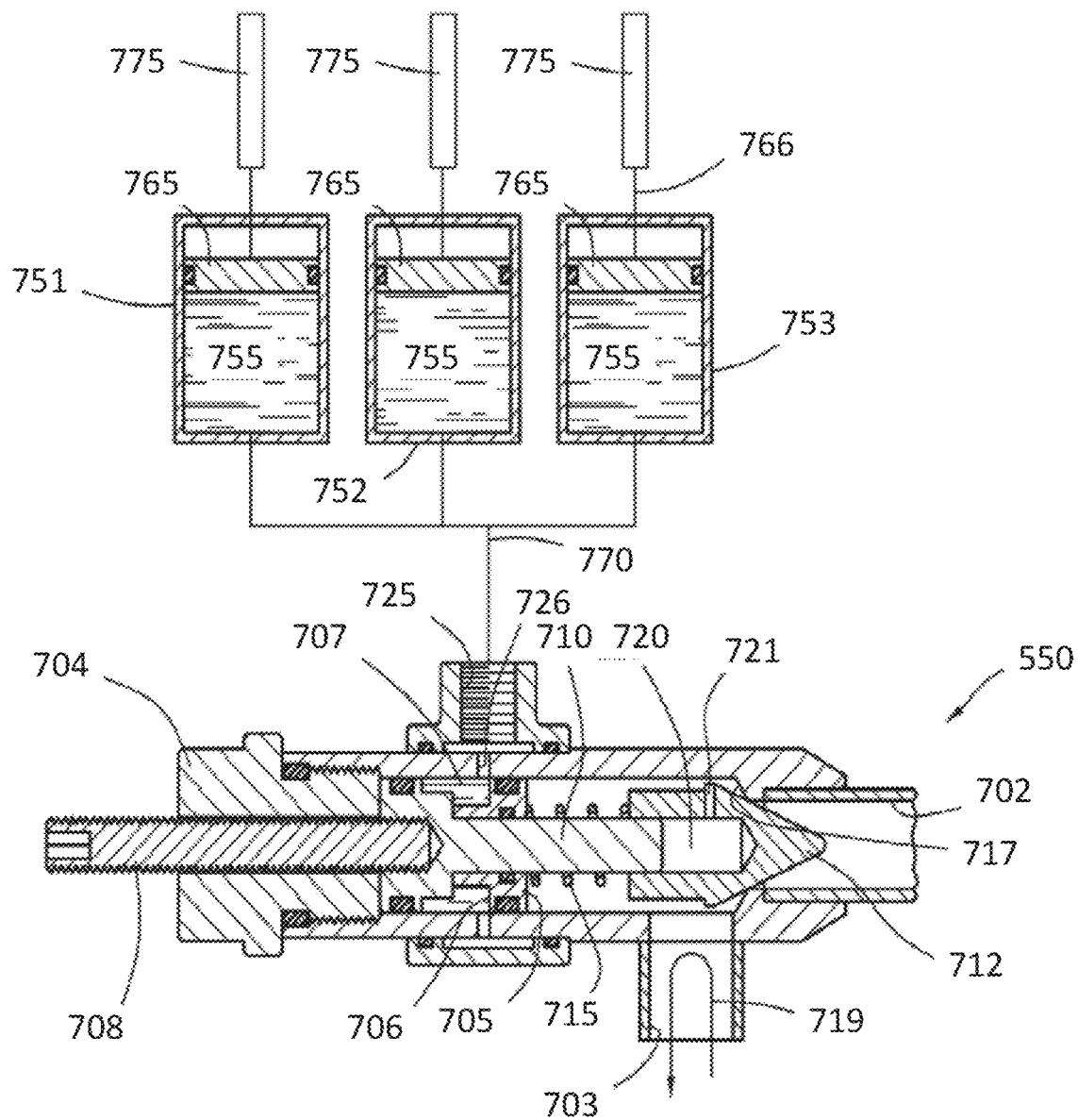
FIG. 5A is an enlarged section view showing an active valve and a plurality of valve operating cylinders in selective communication with an annular piston surface of the valve, in accordance with an embodiment.
Figure 5B:
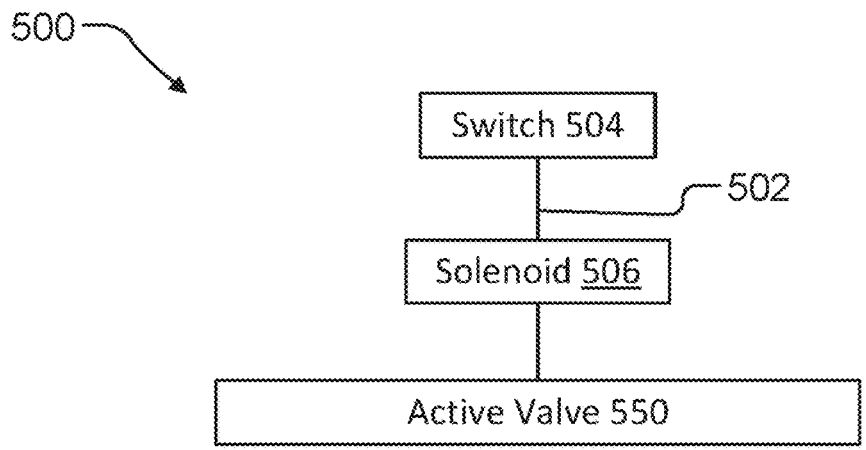
FIG. 5B is a schematic diagram showing a control arrangement for an active valve, in accordance with an embodiment.
Figure 6:
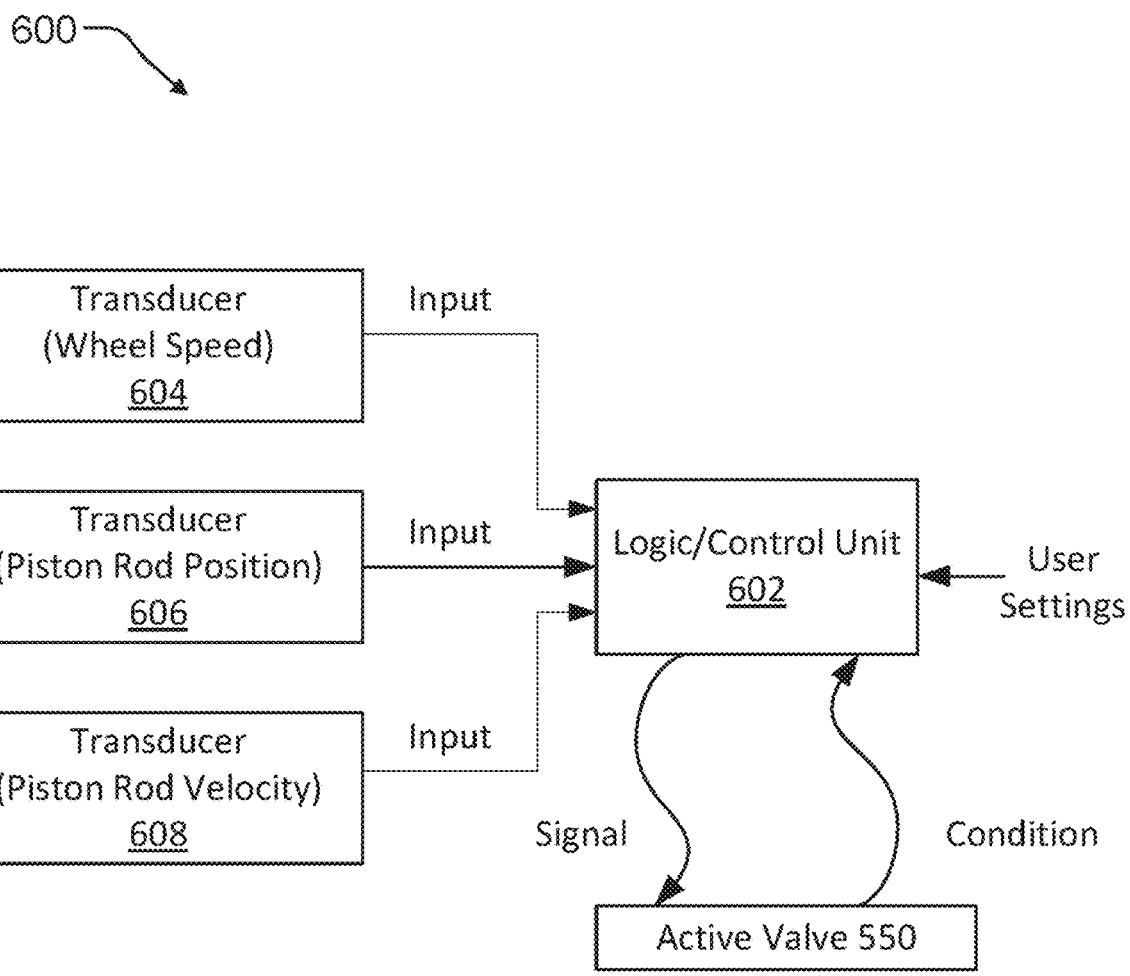
FIG. 6 is a schematic diagram of a control system based upon any or all of vehicle speed, damper rod speed, and damper rod position, in accordance with an embodiment.

In one embodiment, one or more of the valves within shock assembly 100 are active valves as described in further detail in FIGS. 5A-6. In one embodiment, one or more of the valves within shock assembly 100 are non-active valves, e.g., a manual valve that may be adjustable but is not electronically adjustable.

Example Active Valve

Referring now to FIG. 5A, an enlarged view of an active valve 550 is shown in accordance with an embodiment.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Although FIG. 5A shows the active valve 550 in a closed position (e.g. during a rebound stroke of the damper), the following discussion also includes the opening of active valve 550. Active valve 550 includes a valve body 704 housing a movable piston 705 which is sealed within the body. The piston 705 includes a sealed chamber 707 adjacent an annularly-shaped piston surface 706 at a first end thereof. The chamber 707 and annular piston surface 706 are in fluid communication with a port 725 accessed via opening 726. Two additional fluid communication points are provided in the body including an inlet orifice 702 and an outlet orifice 703 for fluid passing through the active valve 550.

Extending from a first end of the piston 705 is a shaft 710 having a cone-shaped nipple 712 (other shapes such as spherical or flat, with corresponding seats, will also work suitably well) disposed on an end thereof. The nipple 712 is telescopically mounted relative to, and movable on, the shaft 710 and is biased toward an extended position due to a spring 715 coaxially mounted on the shaft 710 between the nipple 712 and the piston 705. Due to the spring biasing, the nipple 712 normally seats itself against a seat 717 formed in an interior of the valve body 704.

As shown, the nipple 712 is seated against seat 717 due to the force of the spring 715 and absent an opposite force from fluid entering the active valve 550 along orifice 702. As nipple 712 telescopes out, a gap 720 is formed between the end of the shaft 710 and an interior of nipple 712. A vent 721 is provided to relieve any pressure formed in the gap. With a fluid path through the active valve 550 (from 703 to 702) closed, fluid communication is substantially shut off from the rebound side of the cylinder into the valve body (and hence to the compression side) and its "dead-end" path is shown by arrow 719.

In one embodiment, there is a manual pre-load adjustment on the spring 715 permitting a user to hand-load or un-load the spring using a threaded member 708 that transmits motion of the piston 705 towards and away from the conical member, thereby changing the compression on the spring 715.

Also shown in FIG. 5A is a plurality of valve operating cylinders 751, 752, 753. In one embodiment, the cylinders each include a predetermined volume of fluid 755 that is selectively movable in and out of each cylindrical body through the action of a separate corresponding piston 765 and rod 766 for each cylindrical body. A fluid path 770 runs between each cylinder and port 725 of the valve body where annular piston surface 706 is exposed to the fluid.

Because each cylinder has a specific volume of substantially incompressible fluid and because the volume of the sealed chamber 707 adjacent the annular piston surface 706 is known, the fluid contents of each cylinder can be used, individually, sequentially or simultaneously to move the piston a specific distance, thereby effecting the damping characteristics of the system in a relatively predetermined and precise way.

While the cylinders 751-753 can be operated in any fashion, in the embodiment shown each piston 765 and rod 766 is individually operated by a solenoid 775 and each solenoid, in turn, is operable from a remote location of the vehicle, like a cab of a motor vehicle or even the handlebar area of a motor or bicycle (not shown). Electrical power to the solenoids 775 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 550 is in the damping-open position, fluid flow through orifice 702 provides adequate force on the nipple 712 to urge it backwards, at least partially loading the spring 715 and creating a fluid flow path from the orifice 702 into and through orifice 703.

The characteristics of the spring 715 are typically chosen to permit active valve 550 (e.g. nipple 712) to open at a predetermined pressure, with a predetermined amount of control pressure applied to port 725. For a given spring 715, higher control pressure at port 725 will result in higher pressure required to open the active valve 550 and correspondingly higher damping resistance in orifice 702. In one embodiment, the control pressure at port 725 is raised high enough to effectively "lock" the active valve closed resulting in a substantially rigid compression damper (particularly true when a solid damping piston is also used).

In one embodiment, the valve is open in both directions when the nipple 712 is "topped out" against valve body 704. In another embodiment however, when the valve piston 705 is abutted or "topped out" against valve body 704 the spring 715 and relative dimensions of the active valve 550 still allow for the nipple 712 to engage the valve seat 717 thereby closing the valve. In such embodiment backflow from the rebound side to the compression side is always substantially closed and cracking pressure from flow along orifice 702 is determined by the pre-compression in the spring 715. In such embodiment, additional fluid pressure may be added to the inlet through port 725 to increase the cracking pressure for flow along orifice 702 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 550 can be remotely-operated and can be used in a variety of ways with many different driving and road variables and/or utilized at any point during use of a vehicle. In one example, active valve 550 is controlled based upon vehicle speed in conjunction with the angular location of the vehicle's steering wheel. In this manner, by sensing the steering wheel turn severity (angle of rotation), additional damping (by adjusting the corresponding size of the opening of orifice 702 by causing nipple 712 to open, close, or partially close orifice 702) can be applied to one shock assembly or one set of vehicle shock assemblies on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 550 (and corresponding change to the working size of the opening of orifice 702 by causing nipple 712 to open, close, or partially close orifice 702) in response thereto. In another example, active valve 550 is controlled at least in part by a pressure transducer measuring pressure in a vehicle tire and adding damping characteristics to some or all of the wheels (by adjusting the working size of the opening of orifice 702 by causing nipple 712 to open, close, or partially close orifice 702) in the event of, for example, an increased or decreased pressure reading. In one embodiment, active valve 550 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 702 by causing nipple 712 to open, close, or partially close orifice 702 chambers) in the event of a loss of control to help the operator of the vehicle to regain control.

For example, active valve 550, when open, permits a first flow rate of the fluid through orifice 702. In contrast, when active valve 550 is partially closed, a second flow rate of the fluid though orifice 702 occurs. The second flow rate is less than the first flow rate but greater than no flow rate. When active valve 550 is completely closed, the flow rate of the fluid though orifice 702 is statistically zero.

In one embodiment, instead of (or in addition to) restricting the flow through orifice 702, active valve 550 can vary a flow rate through an inlet or outlet passage within the active valve 550, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 550, can be used to meter the fluid (e.g., working fluid) flow (e.g., control the rate of working fluid flow) with/or without adjusting the flow rate through orifice 702.

Due to the active valve 550 arrangement, a relatively small solenoid (using relatively low amounts of power) can generate relatively large damping forces. Furthermore, due to incompressible fluid inside the shock assembly 100, damping occurs as the distance between nipple 712 and orifice 702 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the body 704 rotates in a reverse direction than that described above and herein, the nipple 712 moves away from orifice 702 providing at least a partially opened fluid path.

FIG. 5B is a schematic diagram showing a control arrangement 500 for a remotely-operated active valve 550. As illustrated, a signal line 502 runs from a switch 504 to a solenoid 506. Thereafter, the solenoid 506 converts electrical energy into mechanical movement and rotates body 704 within active valve 550, In one embodiment, the rotation of body 704 causes an indexing ring consisting of two opposing, outwardly spring-biased balls to rotate among indentions formed on an inside diameter of a lock ring.

As the body 704 rotates, nipple 712 at an opposite end of the valve is advanced or withdrawn from an opening in orifice 702. For example, the body 704 is rotationally engaged with the nipple 712. A male hex member extends from an end of the body 704 into a female hex profile bore formed in the nipple 712. Such engagement transmits rotation from the body 704 to the nipple 712 while allowing axial displacement of the nipple 712 relative to the body 704. Therefore, while the body does not axially move upon rotation, the threaded nipple 712 interacts with mating threads formed on an inside diameter of the bore to transmit axial motion, resulting from rotation and based on the pitch of the threads, of the nipple 712 towards or away from an orifice 702, between a closed position, a partially open position, and a fully or completely open position.

Adjusting the opening of orifice 702 modifies the flowrate of the fluid through active valve 550 thereby varying the stiffness of a corresponding shock assembly 100. While FIG. 5B is simplified and involves control of a single active valve 550, it will be understood that any number of active valves corresponding to any number of fluid channels (e.g., bypass channels, external fluid reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for a bottom out control, an internal bypass, for an external bypass, for a fluid conduit to the external fluid reservoir 125, etc. In other words, anywhere there is a fluid flow path within a shock assembly 100, an active valve could be used. Moreover, the active valve could be alone or used in combination with other active valves at other fluid flow paths to automate one or more of the damping performance characteristics of the shock assembly. Moreover, additional switches could permit individual operation of separate active bottom out valves.

In addition to, or in lieu of, the simple, switch-operated remote arrangement of FIG. 5B, the remotely-operable active valve 550 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping in a shock assembly in the event a damper rod reaches a certain velocity in its travel towards the bottom end of a damper at a predetermined speed of the vehicle. In one embodiment, the control system 600 adds damping (and control) in the event of rapid operation (e.g. high rod velocity) of the shock assembly 100 to avoid a bottoming out of the damper rod as well as a loss of control that can accompany rapid compression of a shock assembly with a relative long amount of travel. In one embodiment, the control system 600 adds damping (e.g., adjusts the size of the opening of orifice 702 by causing nipple 712 to open, close, or partially close orifice 702) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 550 for changing the working size of the opening of orifice 702 by causing nipple 712 to open, close, or partially close orifice 702. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 550 (e.g., the logic unit 602 is an activation signal provider) to cause active valve 550 to move into the desired state (e.g., adjust the flow rate by adjusting the distance between nipple 712 and orifice 702). Thereafter, the condition, state or position of active valve 550 is relayed back to logic unit 602 via an active valve monitor or the like.

In one embodiment, logic unit 602 shown in FIG. 6 assumes a single active valve 550 corresponding to a single orifice 702 of a single shock assembly 100, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

It should be appreciated that the automatically adjustable ride height capability discussed herein could be incorporated into a shock assembly like FIG. 1A, or in another embodiment, into a shock assembly with more, fewer, or different components than those shown in FIG. 1A. Moreover, the automatically adjustable ride height capability disclosed herein could be used on one or more shock assemblies across an assortment of vehicles such as, but not limited to a bicycle, motorcycle, ATV, jet ski, car, snow mobile, side-by-side, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A shock assembly comprising:
   a main chamber comprising a fluid therein;
   a pump tube within said main chamber, said pump tube having a fluid flow path internal thereto, said pump tube disposed axially along a center of said main chamber;
   a damping piston coupled to a shaft, said damping piston and a portion of said shaft disposed axially about said pump tube, said damping piston disposed in said main chamber to divide said main chamber into a compression side fluid chamber and a rebound side fluid chamber;
   an automatic ride height adjustment assembly comprising:
      a tube-in-shaft pump assembly; and
      a spring preload piston assembly;
   wherein said tube-in-shaft pump assembly comprises:
      an intake/exhaust port through a portion of said pump tube; and a fluid path from said pump tube to said spring preload piston assembly;
wherein an axial motion of said damping piston and said shaft along said pump tube during a compression stroke pump said fluid through said pump tube and into said spring preload piston assembly; and
wherein a SAG ride height is established by an axial location of said intake/exhaust port of said pump tube.

2. The shock assembly of claim 1, wherein said spring preload piston assembly comprises:
a fluid chamber in fluid communication with said pump tube; and
a spring retainer that extends from a portion of said fluid chamber, said spring retainer axially adjustable along said main chamber, such that a change in an amount of said fluid in said fluid chamber automatically changes a length of the spring retainer that extends from said fluid chamber which changes a ride height of said shock assembly.

3. The shock assembly of claim 1, further comprising:
said intake/exhaust port configured to allow an amount of said fluid to be pumped through said pump tube and into said spring preload piston assembly to increases a length of said spring preload piston assembly, when said damping piston coupled to said shaft covers said intake/exhaust port during a compression stroke.

4. The shock assembly of claim 1, further comprising:
said intake/exhaust port configured to allow an amount of said fluid to be drawn from said spring preload piston assembly and said main chamber and into said pump tube to reduce a length of said spring preload piston assembly, when said damping piston coupled to said shaft covers said intake/exhaust port during a rebound stroke.

5. The shock assembly of claim 1, further comprising:
said intake/exhaust port configured to allow an amount of said fluid to be pumped through said pump tube and into said main chamber, when said damping piston coupled to said shaft does not cover said intake/exhaust port during a compression stroke; and
a bleed check valve to drain an amount of said fluid from said spring preload piston assembly into said pump tube to reduce a length of said spring preload piston assembly, when said damping piston coupled to said shaft does not cover said intake/exhaust port during said compression stroke.

6. The shock assembly of claim 1, further comprising:
said intake/exhaust port configured to allow an amount of said fluid to be drawn from said spring preload piston assembly and said main chamber into said pump tube to reduce a length of said spring preload piston assembly, when said damping piston coupled to said shaft does not cover said intake/exhaust port during a compression stroke.

7. The shock assembly of claim 1, wherein said tube-in-shaft pump assembly comprises:
a fluid path from said pump tube to said spring preload piston assembly;
a preload spring spacer coupled with said damping piston and said shaft, wherein an axial motion of said damping piston and said spring spacer along said pump tube during a compression stroke pumps said fluid through said pump tube and to said spring preload piston assembly;
a valve to control said fluid returning from said spring preload piston assembly to said pump tube via said fluid path;
a preload spring in said pump tube between said preload spring spacer and said valve; and
a bleed orifice to control a rate of bleed from said spring preload piston assembly.

8. The shock assembly of claim 7, further comprising:
a low riding shock assembly configuration such that said preload spring applies a pressure to said valve to engage said valve,
wherein said engaged valve allows said fluid through said fluid path from said pump tube to said spring preload piston assembly, to increase a length of said spring preload piston assembly, and
wherein said engaged valve does not allow said fluid through said fluid path from said spring preload piston assembly to said pump tube to maintain a length of said spring preload piston assembly.

9. The shock assembly of claim 7, further comprising:
a high riding shock assembly configuration such that said preload spring does not engage said valve,
wherein said not engaged valve allows said fluid through said fluid path from said pump tube to said spring preload piston assembly, and
wherein said not engaged valve allows said fluid through said fluid path from said spring preload piston assembly to said pump tube to reduce a length of said spring preload piston assembly.

10. The shock assembly of claim 1, further comprising
a valve, wherein said valve is configured to provide tunable fluid flow between the pump tube and said main chamber in order to regulate the spring preload.

11. A method for automatically adjusting a ride height of a shock assembly, said method comprising:
accessing a main chamber of said shock assembly, said main chamber comprising a fluid therein;
installing a pump tube within said main chamber, said pump tube having a fluid flow path internal thereto, said pump tube disposed axially along a center of said main chamber;
disposing a damping piston coupled to a shaft and a portion of said shaft axially about said pump tube, said damping piston dividing said main chamber into a compression side fluid chamber and a rebound side fluid chamber;
providing an automatic ride height adjustment assembly for said shock assembly, said automatic ride comprising:
incorporating a tube-in-shaft pump assembly internal to said shock assembly; and
providing a spring preload piston assembly external to at least a portion of said main chamber of said shock assembly;
wherein said incorporating said tube-in-shaft pump assembly internal to said shock assembly comprises:
providing an intake/exhaust port through a portion of said pump tube; and
providing a fluid path from said pump tube to said spring preload piston assembly;
wherein an axial motion of said damping piston and said shaft along said pump tube, during a compression stroke, pump said fluid through said pump tube and into said spring preload piston assembly; and
establishing a SAG ride height based on an axial location of said intake/exhaust port of said pump tube.

12. The method of claim 11, wherein said spring preload piston assembly external to at least a portion of said main chamber of said shock assembly further comprising:

providing a fluid chamber in fluid communication with said pump tube; and inserting a spring retainer into said fluid chamber, said spring retainer extending from a portion of said fluid chamber, said spring retainer axially adjustable along said main chamber, such that a change in an amount of said fluid in said fluid chamber automatically changes a length of the spring retainer that extends from said fluid chamber which changes a ride height of said shock assembly.

13. The method of claim 11, further comprising:

during a low ride height compression stroke, covering said intake/exhaust port with said damping piston coupled to said shaft, pumping an amount of said fluid through said pump tube and into said spring preload piston assembly to increases a length of said spring preload piston assembly; and during a low ride height rebound stroke, covering said intake/exhaust port with said damping piston coupled to said shaft, drawing an amount of said fluid from said spring preload piston assembly and said main chamber into said pump tube.

14. The method of claim 11, further comprising:

during a high ride height compression stroke, not covering said intake/exhaust port with said damping piston coupled to said shaft, pumping an amount of said fluid through said pump tube and into said main chamber;

utilizing a bleed check valve to drain an amount of said fluid from said spring preload piston assembly into said pump tube to reduce a length of said spring preload piston assembly; and during a high ride height rebound stroke, not covering said intake/exhaust port with said damping piston coupled to said shaft, drawing an amount of said fluid from said spring preload piston assembly and said main chamber into said pump tube.

15. The method of claim 11, wherein said incorporating said tube-in-shaft pump assembly internal to said shock assembly comprises:

providing a fluid path from said pump tube to said spring preload piston assembly;

coupling a preload spring spacer with said damping piston and said shaft, wherein an axial motion of said damping piston and said preload spring spacer along said pump tube during a compression stroke causes said fluid to be pumped from said pump tube through said fluid path and to said spring preload piston assembly;

utilizing a valve to control said fluid returning from said spring preload piston assembly to said pump tube via said fluid path;

providing a preload spring in said pump tube between said preload spring spacer and said valve to apply an amount of pressure to said valve; and utilizing a bleed orifice to control a rate of bleed from said spring preload piston assembly.

16. The method of claim 15, further comprising:

providing a low riding shock assembly configuration comprising:

applying a spring pressure from said preload spring to said valve to engage said valve;

engaging said valve allows said fluid through said fluid path from said pump tube to said spring preload piston assembly, to increase a length of said spring preload piston assembly; and engaging said valve does not allow said fluid through said fluid path from said spring preload piston assembly to said pump tube.

17. The method of claim 15, further comprising:

providing a high riding shock assembly configuration comprising:

applying less than a threshold amount of spring pressure from said preload spring to said valve such that said valve is a disengaged valve;

disengaging said valve allows said fluid through said fluid path from said pump tube to said spring preload piston assembly; and disengaging said valve allows said fluid through said fluid path from said spring preload piston assembly to said pump tube to reduce a length of said spring preload piston assembly.

* * * * *